(12) United States Patent
Koshimizu et al.

(10) Patent No.: US 7,428,080 B2
(45) Date of Patent: Sep. 23, 2008

(54) IMAGE READING APPARATUS, METHOD OF CONTROLLING IMAGE READING APPARATUS, PROGRAM, AND COMPUTER READABLE STORAGE MEDIUM

(75) Inventors: Masato Koshimizu, Kanagawa (JP); Mitsugu Hanabusa, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 907 days.

(21) Appl. No.: 10/358,669

(22) Filed: Feb. 5, 2003

(65) Prior Publication Data

US 2003/0174371 A1     Sep. 18, 2003

(30) Foreign Application Priority Data

Feb. 5, 2002   (JP) .............................. 2002-028573
Feb. 8, 2002   (JP) .............................. 2002-032718

(51) Int. Cl.
*H04N 1/04* (2006.01)

(52) U.S. Cl. ................... 358/474; 358/475; 358/509; 358/587; 250/208.1

(58) Field of Classification Search ............... 358/474, 358/475, 509, 497, 512, 513, 501; 250/208.1, 250/234
See application file for complete search history.

(56) References Cited

U.S. PATENT DOCUMENTS

| 5,038,028 | A | | 8/1991 | Boyd et al. | |
|---|---|---|---|---|---|
| 5,289,000 | A | * | 2/1994 | Toyofuku | 250/234 |
| 5,336,878 | A | * | 8/1994 | Boyd et al. | 250/208.1 |
| 6,051,826 | A | * | 4/2000 | Arimoto et al. | 250/208.1 |
| 6,184,515 | B1 | * | 2/2001 | Bohn | 250/208.1 |
| 6,191,406 | B1 | * | 2/2001 | Nelson et al. | 250/208.1 |
| 6,268,598 | B1 | * | 7/2001 | Dow et al. | 250/208.1 |
| 6,493,061 | B1 | | 12/2002 | Arita et al. | |
| 6,522,401 | B2 | * | 2/2003 | Lu | 356/213 |
| 6,765,701 | B2 | * | 7/2004 | Yang et al. | 358/487 |
| 6,791,721 | B1 | * | 9/2004 | Konogaya et al. | 358/474 |

(Continued)

FOREIGN PATENT DOCUMENTS

JP         07-079320        3/1995

(Continued)

OTHER PUBLICATIONS

Japanese Office Action dated Apr. 28, 2006 (Japanese Patent Appln. No. 2002-032718).

*Primary Examiner*—Edward L. Coles
*Assistant Examiner*—Negussie Worku
(74) *Attorney, Agent, or Firm*—Morgan & Finnegan, L.L.P.

(57) ABSTRACT

This invention has as its object to obtain a high-quality read image from which dust or scratches have been removed by an image reading apparatus which reads image information on a transparent original by synchronously scanning a light source unit and image reading unit. To this end, upon reading a transparent original, infrared LED chips on a dust/scratch detection LED substrate and a transparent original illumination lamp are turned on to make alignment between the LED substrate and the image reading unit, and dust/scratch detection image information is obtained by synchronously moving the light source unit and image reading unit in the subscanning direction.

Subsequently, alignment between the transparent original illumination lamp and image reading unit is made, and image information of the transparent original is obtained by synchronously moving the light source unit and image reading unit in the subscanning direction.

12 Claims, 25 Drawing Sheets

U.S. PATENT DOCUMENTS

| | | | |
|---|---|---|---|
| 7,027,194 B2 * | 4/2006 | Kanda | 358/496 |
| 7,138,619 B1 * | 11/2006 | Ferrante et al. | 250/216 |
| 2001/0030278 A1 | 10/2001 | Koshimizu | |
| 2002/0048411 A1 * | 4/2002 | Takayama et al. | 382/275 |

FOREIGN PATENT DOCUMENTS

| | | |
|---|---|---|
| JP | 10-4481 | 1/1998 |
| JP | 11-187222 | 7/1999 |
| JP | 2000-349976 | 12/2000 |
| JP | 2001-189833 | 7/2001 |
| JP | 2001-298593 | 10/2001 |
| JP | 2002-010029 | 1/2002 |

* cited by examiner

F I G. 25A
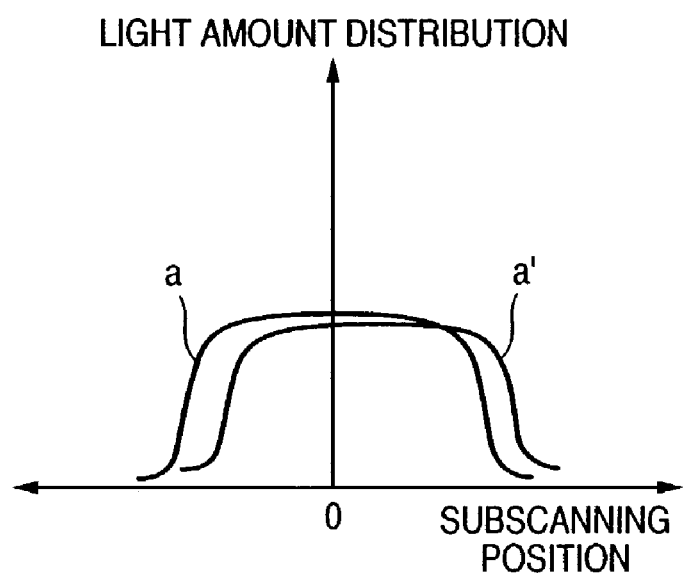
F I G. 25B
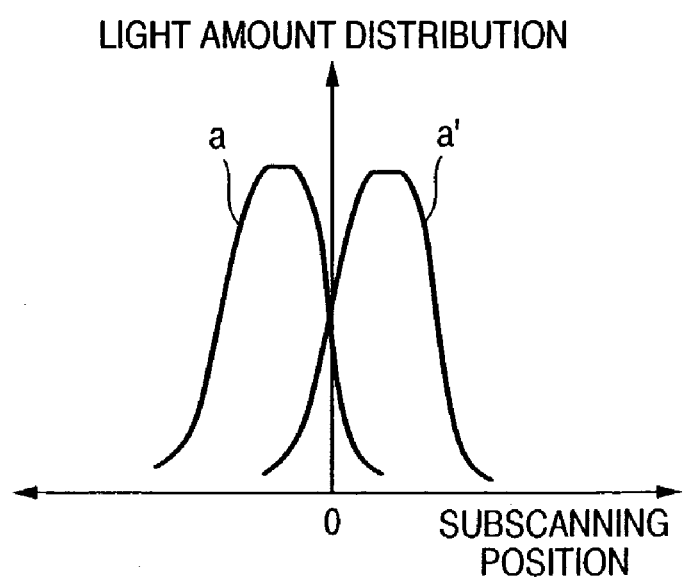

IMAGE READING APPARATUS, METHOD OF CONTROLLING IMAGE READING APPARATUS, PROGRAM, AND COMPUTER READABLE STORAGE MEDIUM

FIELD OF THE INVENTION

The present invention relates to an image reading apparatus for reading image information of an object, a light source unit, a method of controlling an image reading apparatus, a program, and a computer readable storage medium.

BACKGROUND OF THE INVENTION

Conventionally, an image reading apparatus 101 which can read a transparent original is comprised of an apparatus main body 103 which includes an image reading device 102, and a transparent original irradiation apparatus 104 which is pivotally arranged on the apparatus main body 103, as shown in FIG. 8. The frame body of the transparent original irradiation apparatus 104 is formed by an upper cover 105 and a translucent lower cover 106 having a light diffusion effect, and it has a light source 107 for scan exposure, and a drive unit (not shown) for moving the light source 107.

When the image reading apparatus with the above arrangement reads image information of a transparent original F, the original F is set on a document glass table 108 of the apparatus main body 103. The light source 107 and image reading device 102 are synchronously moved and scanned in the direction of an arrow X in FIG. 8 while turning on the light source 107. In this way, light emitted by the light source 107 is guided to the image reading device 102 via the translucent lower cover 106 with the light diffusion effect and the transparent original F, thus reading the image information of the transparent original F.

However, when dirt such as dust exists on a transparent original F or the surface of the transparent original F is damaged (scratched), the conventional image reading apparatus reads even the dirt or scratch, so the image degrades owing to the dirt or scratch.

Recently, along with the development of a communication network and the increases in speed of a computer and capacity of a storage medium, the color image information is required to be treated at a higher resolution. In particular, when color image information is read by a scanner and the like, a demand for reading the image more accurately at higher speed and higher resolution has arisen.

When reading the image of the photographic film, a demand for reading the image information of the photographic film having a plurality of frames in a sleeve form more accurately at higher speed and higher resolution has arisen. As a means for reading a film at higher resolution, an image reading apparatus which has a means for removing the dust or scratch on the film is proposed. The Japanese Patent Laid-Open No. 2001-298593 is an example of the image reading apparatus. According to this proposal, the light source including the infrared LED for detecting the dust/scratch information and the light source for reading the image information is arranged as the surface light source, so that the image in which the influence of the dust or scratch is reduced can be read.

However, since the surface light source as an indirect illumination system has poor illumination efficiency, a device that synchronously moves an illumination system and optical system is known as a device that reads an image at higher speed and with higher image quality. As a method of controlling these illumination system and optical system, a method disclosed in Japanese Patent Laid-Open No. 10-004481 or the like is known. According to the technique described in this reference, the influences of, e.g., synchronous errors caused by positional deviation between the illumination system and optical system can be reduced as much as possible.

An example that relates to this reference will be briefly explained below using FIGS. 22, 23, and 24.

FIG. 22 shows an example of an image input apparatus which can read both a document original or the like, and a photographic film. FIG. 23 shows a state wherein the image reading apparatus shown in FIG. 22 mounts a fixing member used to fix a photographic film upon reading a photographic film.

A transparent original illumination apparatus 502 which is required for reading the transparent original such as the photographic film is arranged in an image reading apparatus 501, and electrically connected to the image reading apparatus 501 via a transparent original light source lighting inverter 507 and I/F cable 515 so as to be controllable from an image reading apparatus control board 503. The transparent original illumination apparatus 502 has a transparent original illumination unit 518 including a transparent original illumination unit 504 for reading the transparent original. An optical unit 514 includes a first reflecting mirror 509, second reflecting mirror 510, third reflecting mirror 511, and lens 512 which are required for optically forming the image of the transparent original on a CCD image sensor 513, and a reflecting original illumination light source 508 for irradiating the reflecting original such as the document original, and reads the image while scanning the original in the directions indicated by the arrows shown in FIG. 22 (in a subscanning direction) by the image input apparatus control board 503 and a motor 516.

The CCD image sensor 513 and image input apparatus control board 503 are electrically connected to each other via a signal cable 517. Hence, an electric signal photoelectrically converted by the CCD image sensor 513 can be obtained as image data by scanning the original while synchronizing the transparent original illumination unit 518 and optical unit 514 by the motor 516. A transparent plate 519 in the transparent original illumination apparatus 502, which exists between the transparent original illumination unit 518 and a film guide 505 on a document glass table 506 uses transparent glass or a diffusion member.

Upon reading a transparent original such as a film or the like, the film is fixed by the film guide 505 mounted on the document glass table 506. As shown in FIG. 23, the film guide 505 has a calibration region S used to calibrate illumination light coming from the transparent original light source 504. Also, A shown in FIG. 23 indicates one frame of a photographic film.

FIG. 24 shows an optical position alignment method required to synchronously scan the transparent original illumination unit 518 and optical unit 514.

The optical unit 514 is moved in advance to a position corresponding to the calibration region S formed on the film guide 505, which is set at a predetermined position, and the transparent original illumination unit 518 is scanned a distance D in the direction of an arrow before the beginning of image reading, so as to seek a position where an optical output becomes maximum or a position effective to read a film at nearly two end positions a and a' within the calibration region S. Upon reading an image, a scan is made by maintaining that positional relationship all the time, thus allowing high-speed reading of a high-quality image.

However, for example, if the transparent original illumination unit 518 and optical unit 514 do not have a correct parallel positional relationship, the aforementioned method is effective for a case wherein the light amount distributions in the subscanning direction have broad uniform ranges, as shown in FIG. 25A. But when the light amount distributions in the subscanning direction have narrow uniform ranges, as shown in FIG. 25B, the aforementioned method cannot cope with since positions a and a' have different maximum optical output positions.

That is, when the optical system and illumination system are laid out with a large tilt in the main scan direction, the light source must have a sufficiently uniform light amount distribution, resulting in a drop of illumination efficiency at the reading position. Or a precise layout is required so as not to generate a difference between the light amount distributions in the subscanning direction at positions a and a' in the calibration region S, resulting in an increase in cost.

When a light source requires a warm up time like a cold cathode fluorescent lamp (to be abbreviated as a CCFL hereinafter), the illumination system and optical system can only be precisely aligned after the warm up time has elapsed. For this reason, a pre-processing time in an image reading process increases. Even when a plurality of frames are to be read or when intermittent reading frequently occurs due to communication problems, since the precision free from any positional deviation is required, a problem such as an increase in cost or the like remains unsolved.

SUMMARY OF THE INVENTION

Therefore, the present invention has been made in consideration of the above situation, and has as its object to prevent deterioration of an image due to dust or scratches.

It is another object of the present invention to facilitate position alignment between a transparent original illumination apparatus and an optical unit used to read an image.

It is still another object of the present invention to shorten a pre-processing time in an image reading process.

In order to solve the aforementioned problems and to achieve the above objects, according to the first aspect of the present invention, an image reading apparatus comprises a light source unit which can emit light using a first light source that emits first light in a range including at least a visible range, and a second light source that emits second light in an invisible range, an image reading unit adapted to form an object image illuminated by the light source unit on an image sensing element via an optical system, and an information reading device adapted to acquire image information of the object image illuminated with the first light, and image information of the object image illuminated with the second light by moving the light source unit and the image reading unit relative to the object in a subscanning direction, and the first and second light sources are juxtaposed in a main scan direction.

According to the second aspect of the present invention, a method of controlling an image reading apparatus which comprises a light source unit which can emit light using a first light source that emits first light in a range including at least a visible range, and a second light source that emits second light in an invisible range, and an image reading unit adapted to form an object image illuminated by the light source unit on an image sensing element via an optical system, comprises the information reading step of acquiring image information of the object image which is illuminated in turn with light coming from the first and second light sources by moving the light source unit, in which the first and second light sources are juxtaposed in a main scan direction, and the image reading unit relative to the object in a subscanning direction.

According to the third aspect of the present invention, a program for controlling an image reading apparatus, which comprises a light source unit which can emit light using a first light source that emits first light in a range including at least a visible range, and a second light source that emits second light in an invisible range, and an image reading unit adapted to form an object image illuminated by the light source unit on an image sensing element via an optical system, makes the apparatus execute an information acquisition process adapted to acquire image information of the object image illuminated with the first light, and image information of the object image illuminated with the second light by moving the light source unit and the image reading unit relative to the object in a subscanning direction.

According to the fourth aspect of the present invention, a computer readable storage medium stores the aforementioned program.

According to the fifth aspect of the present invention, an image reading apparatus for reading image information on an original by synchronously scanning a light source unit which has at least one light source adapted to illuminate the original with light, and an image reading unit which has a photoelectric conversion device adapted to photoelectrically convert light received from the original relative to the original in a subscanning direction, comprises a region determination device adapted to determine a reading region of an image for alignment upon making alignment between the light source unit and the image reading unit in a main scan direction substantially perpendicular to the subscanning direction.

According to the sixth aspect of the present invention, an image reading apparatus for reading image information on a transparent original by synchronously scanning a light source unit which has first and second light sources that irradiate the original with light and have different characteristics, and an image reading unit which has a photoelectric conversion device adapted to photoelectrically convert light received from the original relative to the original in a subscanning direction, comprises a subscanning alignment device adapted to make alignment between the light source unit and the image reading unit in the subscanning direction on the basis of image information read by the image reading unit using light coming from the first light source, when the second light source has a broader light amount distribution than the first light source.

According to the seventh aspect of the present invention, an image reading apparatus for reading image information on an original by synchronously scanning a light source unit which has at least one light source adapted to illuminate the original with light, and an image reading unit which has a photoelectric conversion device adapted to photoelectrically convert light received from the original relative to the original in a subscanning direction, comprises a subscanning alignment device adapted to make alignment between the light source unit and the image reading unit in the subscanning direction on the basis of an output signal obtained upon irradiating the original with light while relatively moving the light source unit and the image reading unit.

According to the eighth aspect of the present invention, an image reading method for reading image information on an original by synchronously scanning a light source unit which has at least one light source adapted to illuminate the original with light, and an image reading unit which has a photoelectric conversion device adapted to photoelectrically convert light received from the original relative to the original in a subscanning direction, comprises the region determination step of determining a reading region of an image for alignment upon making alignment between the light source unit and the image reading unit in a main scan direction substantially perpendicular to the subscanning direction.

According to the ninth aspect of the present invention, an image reading method for reading image information on a transparent original by synchronously scanning a light source unit which has first and second light sources that irradiate the original with light and have different characteristics, and an image reading unit which has a photoelectric conversion device adapted to photoelectrically convert light received from the original relative to the original in a subscanning direction, comprises the subscanning alignment step of making alignment between the light source unit and the image reading unit in the subscanning direction on the basis of image information read by the image reading unit using light coming from the first light source, when the second light source has a broader light amount distribution than the first light source.

According to the tenth aspect of the present invention, an image reading method for reading image information on an original by synchronously scanning a light source unit which has at least one light source adapted to illuminate the original with light, and an image reading unit which has a photoelectric conversion device adapted to photoelectrically convert light received from the original relative to the original in a subscanning direction, comprises the subscanning alignment step of making alignment between the light source unit and the image reading unit in the subscanning direction on the basis of an output signal obtained upon irradiating the original with light while relatively moving the light source unit and the image reading unit.

According to the eleventh aspect of the present invention, a program makes a computer execute the aforementioned image reading method.

According to the twelfth aspect of the present invention, a storage medium computer-readably stores the aforementioned program.

Other features and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 25A and 25B show the light amount distributions of the transparent original illumination unit to explain prior art.

DETAILED DESCRIPTION OF THE PREFERRED EMBODIMENTS

Preferred embodiments of an image reading apparatus, a method of controlling an image reading apparatus, a program, and a computer readable storage medium according to the present invention will be described hereinafter with reference to the accompanying drawings.

First Embodiment

Figure 1:
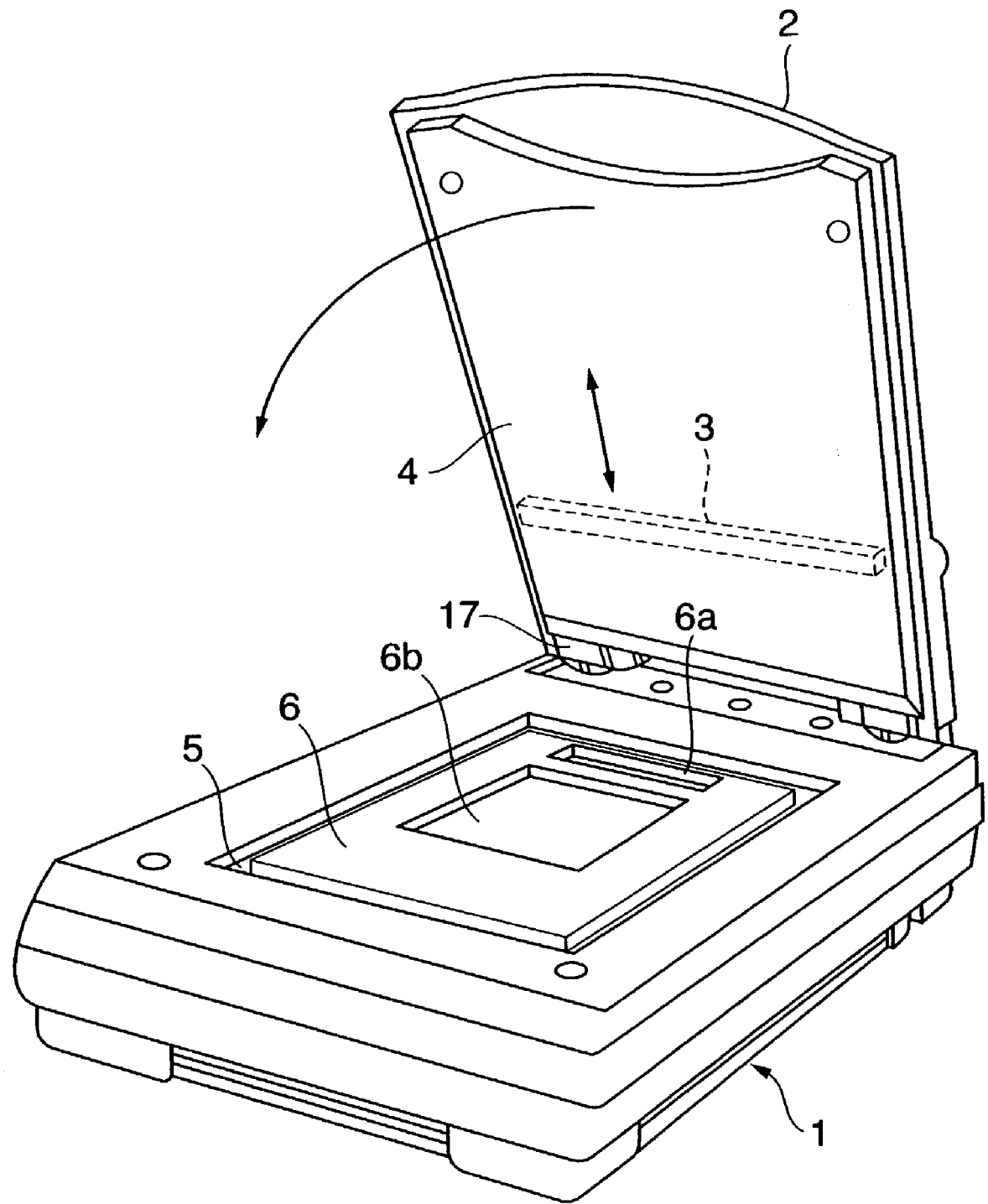
FIG. 1 is a schematic perspective view of an image reading apparatus according to an embodiment of the present invention.

An image reading apparatus of this embodiment will be described below with reference to FIGS. 1 to 5. FIG. 1 is a schematic perspective view of an image reading apparatus of this embodiment. As shown in FIG. 1, a transparent illumination unit 2 is pivotally attached to an apparatus main body 1 of the image reading apparatus via hinges 17. The transparent illumination unit 2 is used to illuminate a transparent original such as a developed photographic film or the like with light upon reading such transparent original.

The transparent illumination unit 2 movably incorporates a light source unit 3 which serves as a transparent original illumination apparatus used to read a transparent original, and its unit lower cover 4 is formed of a translucent member having a light diffusion effect.

A platen glass 5 on which an original to be read is placed is equipped on the apparatus main body 1 of the image reading apparatus. Upon reading a transparent original, a light-shielding sheet 6 is placed on the platen glass 5. The light-shielding sheet 6 has a shading window 6a used to measure shading, and a transparent original setting portion 6b where a transparent original is to be placed.

Figure 2:
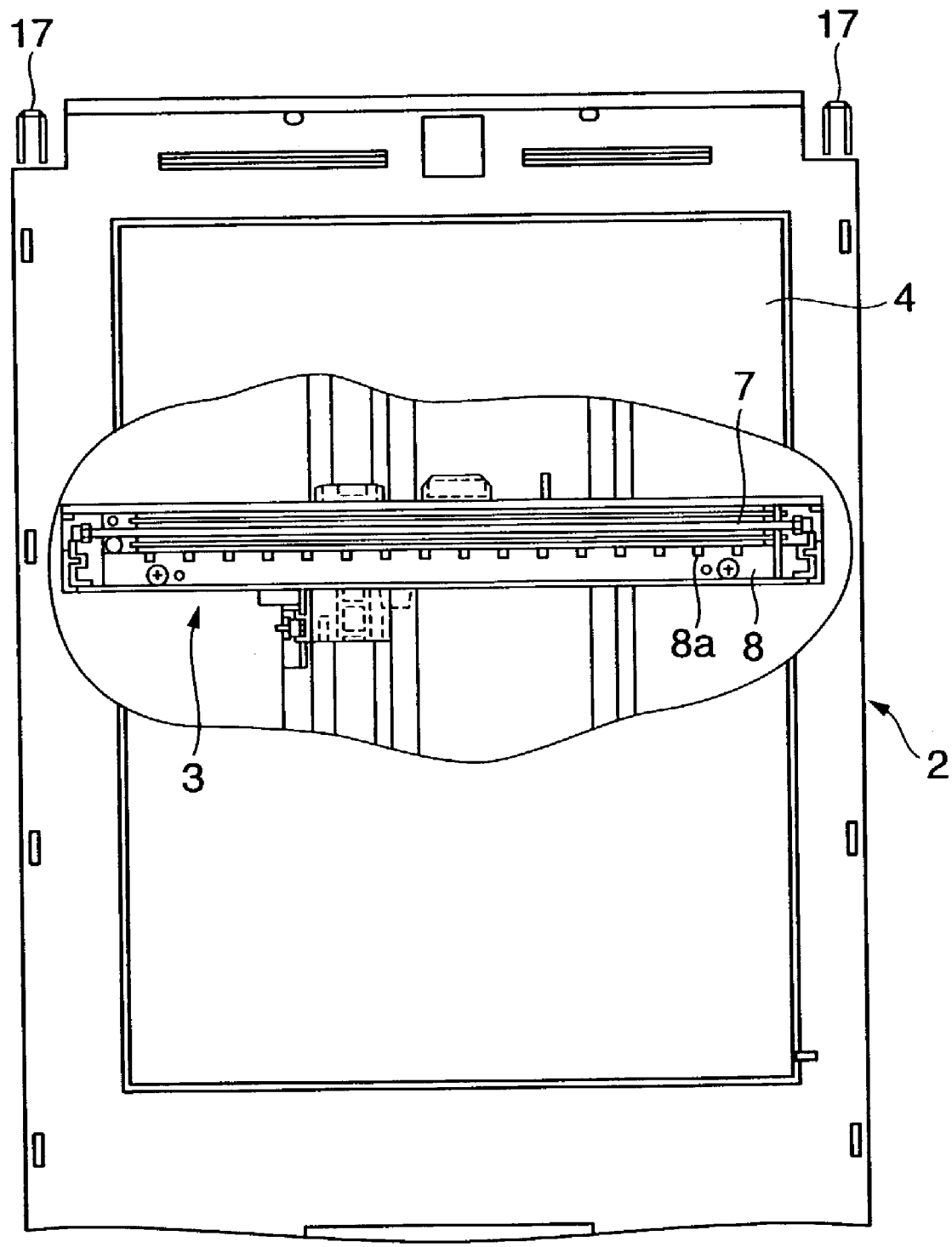
FIG. 2 is a schematic bottom view of a transparent illumination unit 2 according to the first embodiment.
Figure 3A:
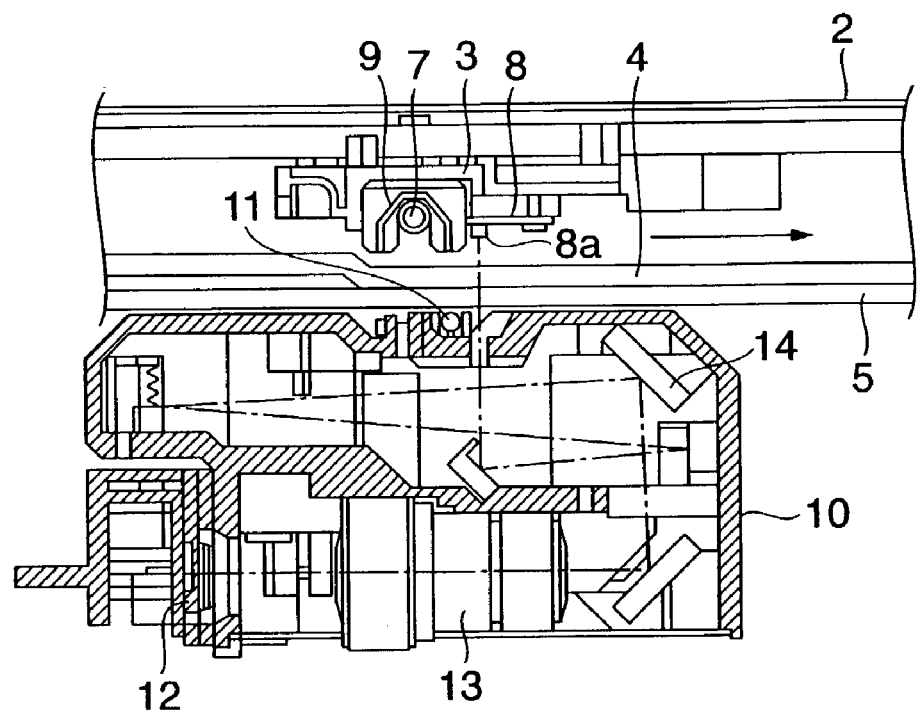
FIGS. 3A and 3B are schematic partial sectional views of an image reading apparatus according to the first embodiment.
Figure 3B:
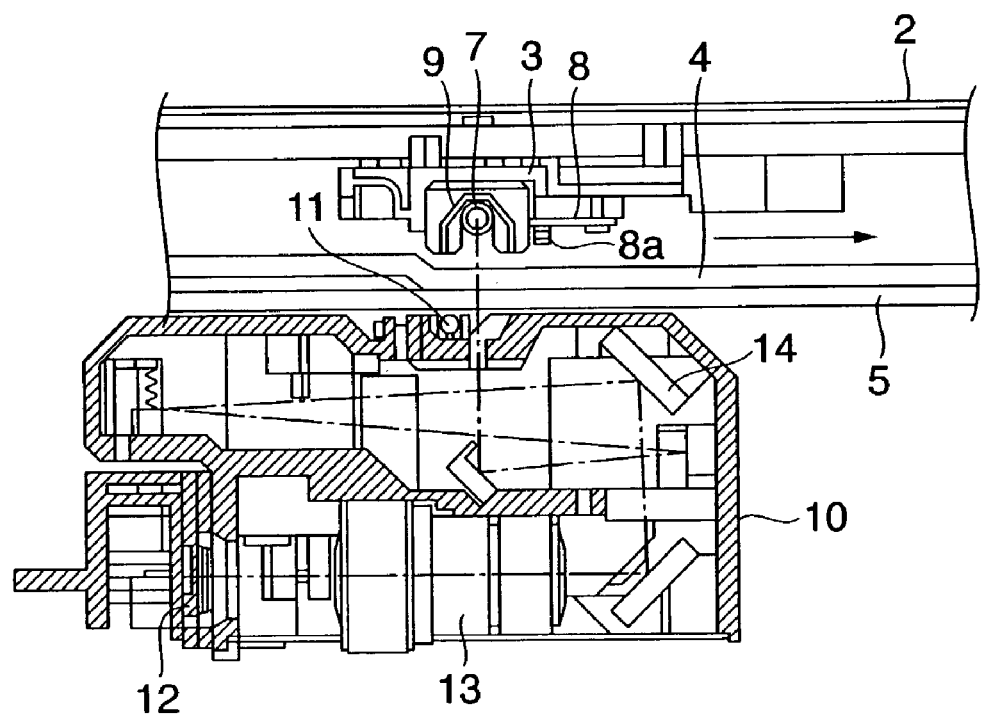
Figure 4:
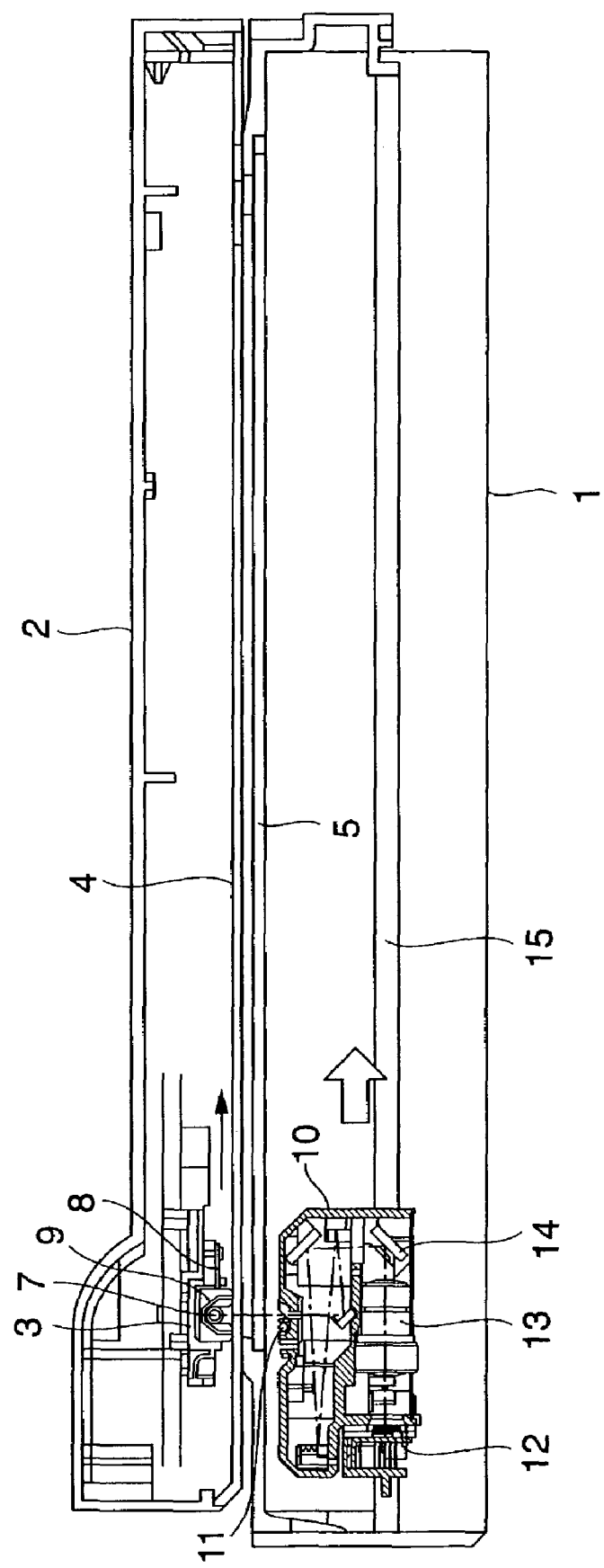
FIG. 4 is a schematic sectional view of the image reading apparatus according to the first embodiment.

FIG. 2 is a schematic bottom view of the transparent illumination unit 2, and FIGS. 3A and 3B are partial sectional views of the image reading apparatus. FIG. 4 is a sectional view of the image reading apparatus.

In the light source unit 3, a transparent original illumination lamp 7 such as a fluorescent lamp, xenon lamp, or the like, which extends in the main scan direction, and a dust/scratch detection LED substrate 8 on which a plurality of infrared LED chips 8a having a luminescence intensity in only an infrared range line up in the main scan direction are arranged parallel to each other.

As shown in FIGS. 3A and 3B, a reflection plate 9 is arranged to cover the transparent original illumination lamp 7. The reflection plate 9 is interposed at least between the transparent original illumination lamp 7 and dust/scratch detection LED substrate 8 so as to prevent light from the transparent original illumination lamp 7 from leaking into an infrared read image upon reading using an infrared light source.

The light source unit 3 with this arrangement is movable by a drive source (not shown) in the subscanning direction in synchronism with an image reading unit 10 arranged in the apparatus main body 1 of the image reading apparatus.

The image reading unit 10 arranged in the apparatus main body 1 of the image reading apparatus has an arrangement in which a reflecting original illumination lamp 11, CCD line sensor 12, lens 13, and reflecting mirror 14 are mounted on a carriage. The CCD line sensor 12 converts an optical image formed on it into an electrical image signal, and comprises a plurality of image sensing elements, which line up in a row.

The image reading unit 10 with this arrangement is movable by a drive source (not shown) along a carriage guide shaft 15 in the subscanning direction.

Figure 5:
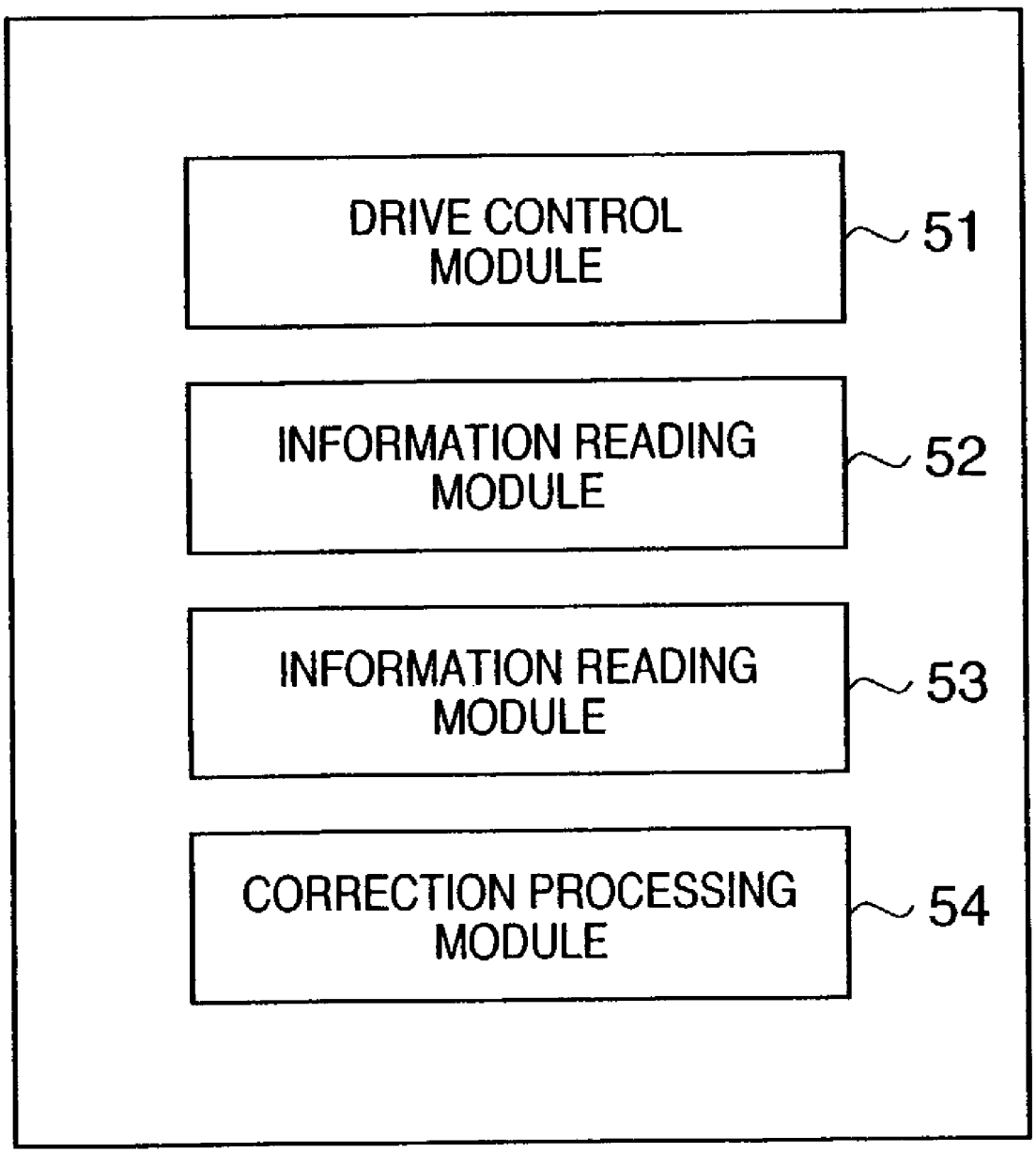
FIG. 5 is a block diagram showing the functional arrangement of a control unit arranged in the image reading apparatus.

FIG. 5 shows the functional arrangement of a control unit arranged in the image reading apparatus. Reference numeral 51 denotes a drive control module for synchronously moving the light source unit 3 and image reading unit 10 in the subscanning direction upon reading image information on a transparent original.

Reference numeral 52 denotes an information reading module for reading image information of a transparent original obtained from the CCD line sensor 12 when the transparent original illumination lamp 7 is turned on, and light transmitted through the transparent original based on the light emitted by the lamp 7 is guided to the CCD line sensor 12.

Reference numeral 53 denotes an information reading module for reading defect information present on a transparent original, which is obtained from the CCD line sensor 12 when the infrared LED chips 8a on the LED substrate 8 are turned on, and light transmitted through the transparent original based on the light emitted by the LED chips 8a is guided to the CCD line sensor 12.

Reference numeral 54 denotes a correction processing module for executing a correction process that removes the defect information from the image information of the transparent original.

The transparent original reading operation will be described below. The reflecting original illumination lamp 11 is turned off, and the infrared LED chips 8a on the dust/scratch detection LED substrate 8 and the transparent original illumination lamp 7 are turned on, so as to align the dust/scratch detection LED substrate 8 and image reading unit 10, as shown in FIG. 3A.

By synchronously moving the light source unit 3 and image reading unit 10 in the subscanning direction, images of dust, scratches, and the like on a transparent original are projected onto the CCD line sensor 12 via the reflecting mirror 14 and lens 13.

In this case, since light coming from the infrared LED chips 8a on the dust/scratch detection LED substrate 8 includes only infrared light components, a transparent original such as a negative film, positive film, or the like transmits the infrared light components independently of its image (exposed image), and images of dust, scratches, and the like that physically intercept an optical path are projected as a shade onto the CCD line sensor 12, thus satisfactory detecting dust or scratches.

In this case, the transparent original illumination lamp 7 is ON. However, since the reflection plate 9 is provided, light coming from the transparent original illumination lamp 7 can be prevented from leaking into an infrared read image.

Subsequently, as shown in FIG. 3B, the transparent original illumination lamp 7 and image reading unit 10 are aligned, and the light source unit 3 and image reading unit 10 are synchronously moved in the subscanning direction, thereby projecting an image on the transparent original onto the CCD line sensor 12 via the reflecting mirror 14 and lens 13.

At this time, since the transparent original illumination lamp 7 has warmed up well, and a warm up time of the lamp itself need not be independently assured, the reading time can be shortened, and an image can be read satisfactorily.

After that, both the dust/scratch detection image information (defect information) obtained by the above method, and the image information read from the image on the transparent original undergo an image process. With this image process, a defect region which is recognized on the dust/scratch detection image and is formed due to dust or scratches is interpolated using its surrounding transparent original read image information, thus obtaining high-quality transparent original image information from which the influences of dust or scratches have been removed.

According to the above embodiment, since a film original as an object is irradiated with infrared light in synchronism with the image reading unit 10, the amount of light with which film original is irradiated can be uniform. More specifically, since light emitted by the light source 8, which is arranged in an array in the main scan direction, is moved relative to the object in the subscanning direction, the film as the object is irradiated with a stable amount of light, and light transmitted through the film can be guided to the CCD line sensor 12 as an image sensing device.

Therefore, both the dust/scratch detection image information (defect information) and image information read from an image on a transparent original can obtain image information which is constant in the subscanning direction.

Second Embodiment

Figure 6:
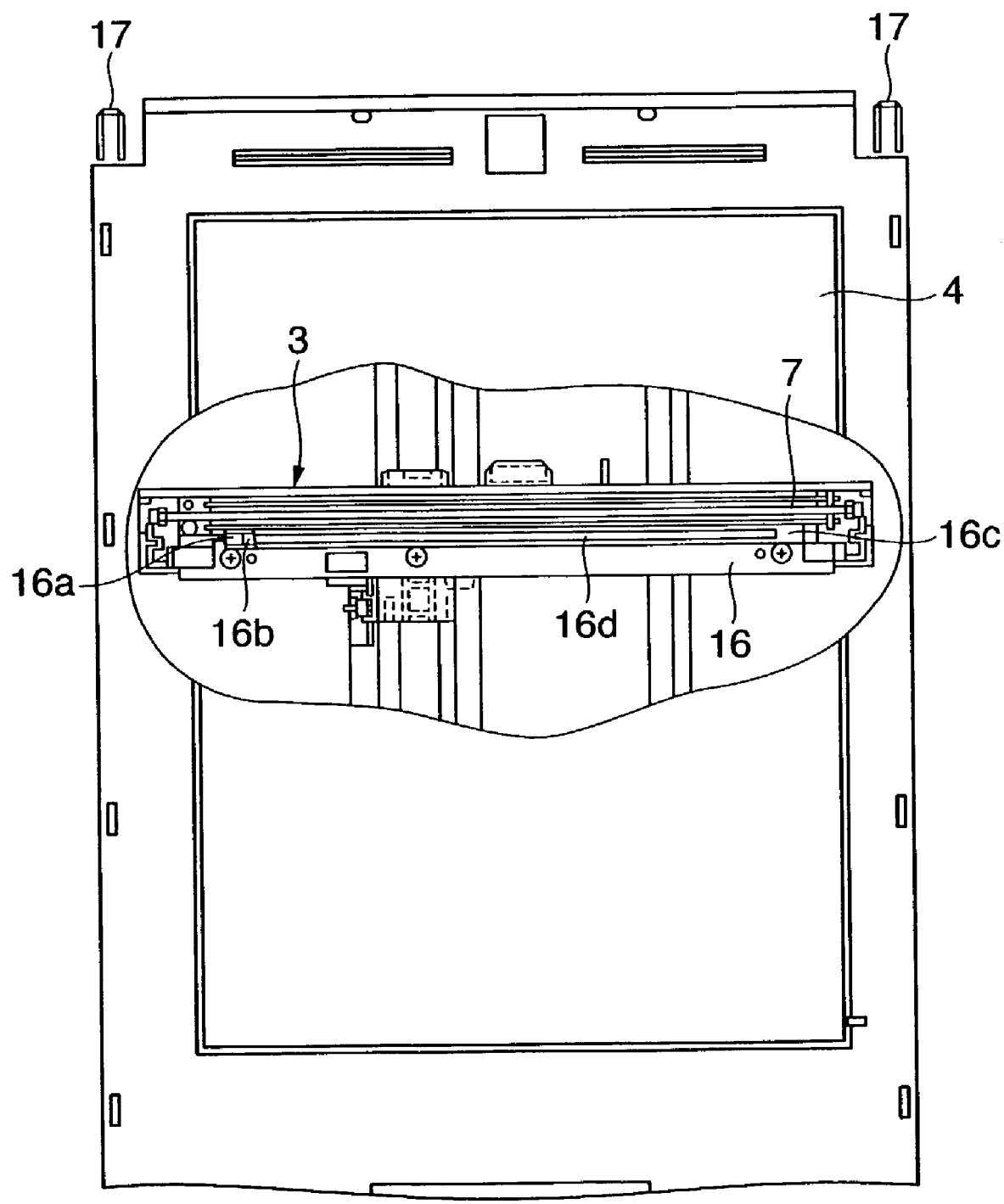
FIG. 6 is a schematic bottom view of a transparent illumination unit 2 according to the second embodiment.

An image reading apparatus according to the second embodiment of the present invention will be described below. In the following description, the same reference numerals denote the same building components as those in the first embodiment described above, and a detailed description thereof will be omitted. FIG. 6 is a schematic bottom view of the transparent illumination unit 2, and FIGS. 7A and 7B are partial sectional views of an image reading apparatus.

In the light source unit 3 of this embodiment, the transparent original illumination lamp 7 such as a fluorescent lamp, xenon lamp, or the like, which extends in the main scan direction, and a dust/scratch detection LED substrate 16 are arranged parallel to each other as in the first embodiment. Unlike in the first embodiment, an infrared LED 16*a* which has a luminescence intensity in only an infrared range is arranged at one end of the LED substrate 16, and a light guide member 16*b* for guiding light emitted by this infrared LED 16*a* to the entire region in the main scan direction are arranged on the LED substrate 16.

A housing 16*c* covers the infrared LED 16*a* and light guide member 16*b*, and has a light-emitting aperture 16*d*. Note that only one infrared LED 16*a* is arranged. Alternatively, infrared LEDs may be arranged at the two ends of the LED substrate 16.

Figure 7A:
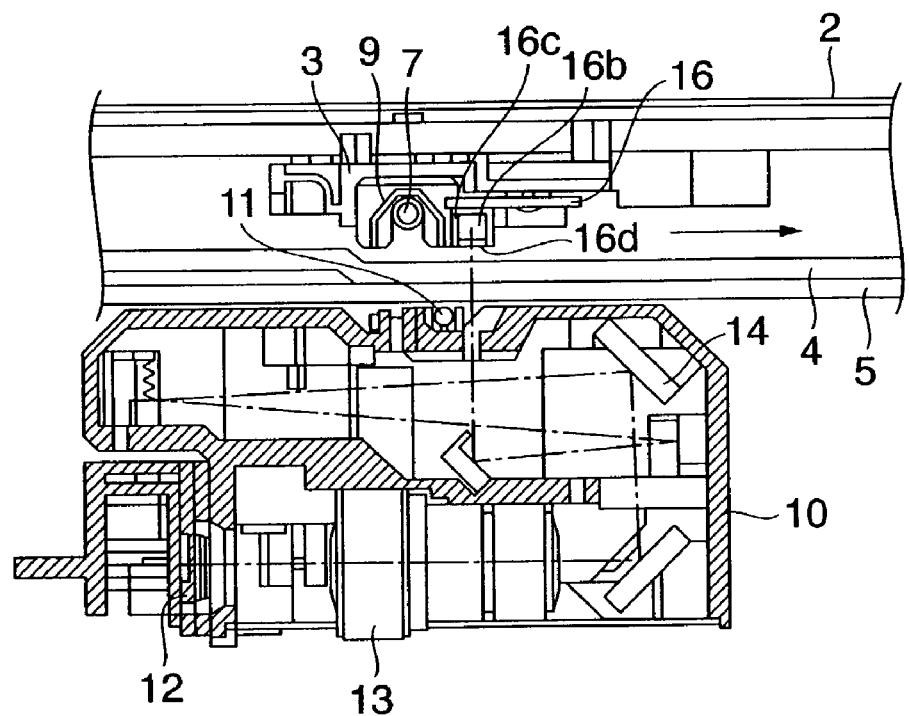
FIGS. 7A and 7B are schematic partial sectional views of an image reading apparatus according to the second embodiment.
Figure 7B:
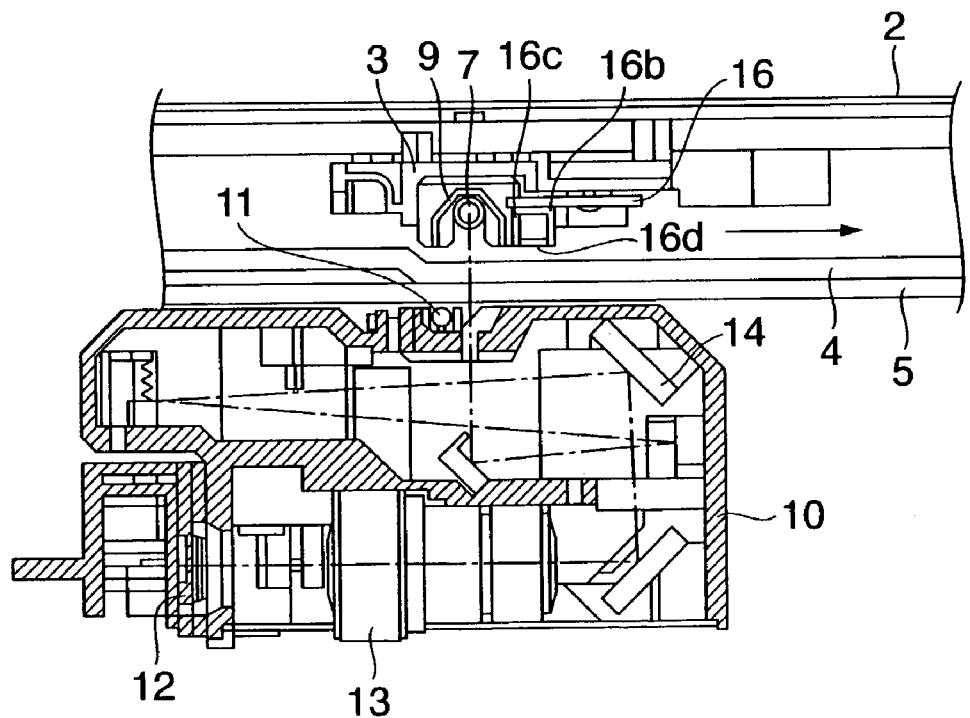
Figure 8:
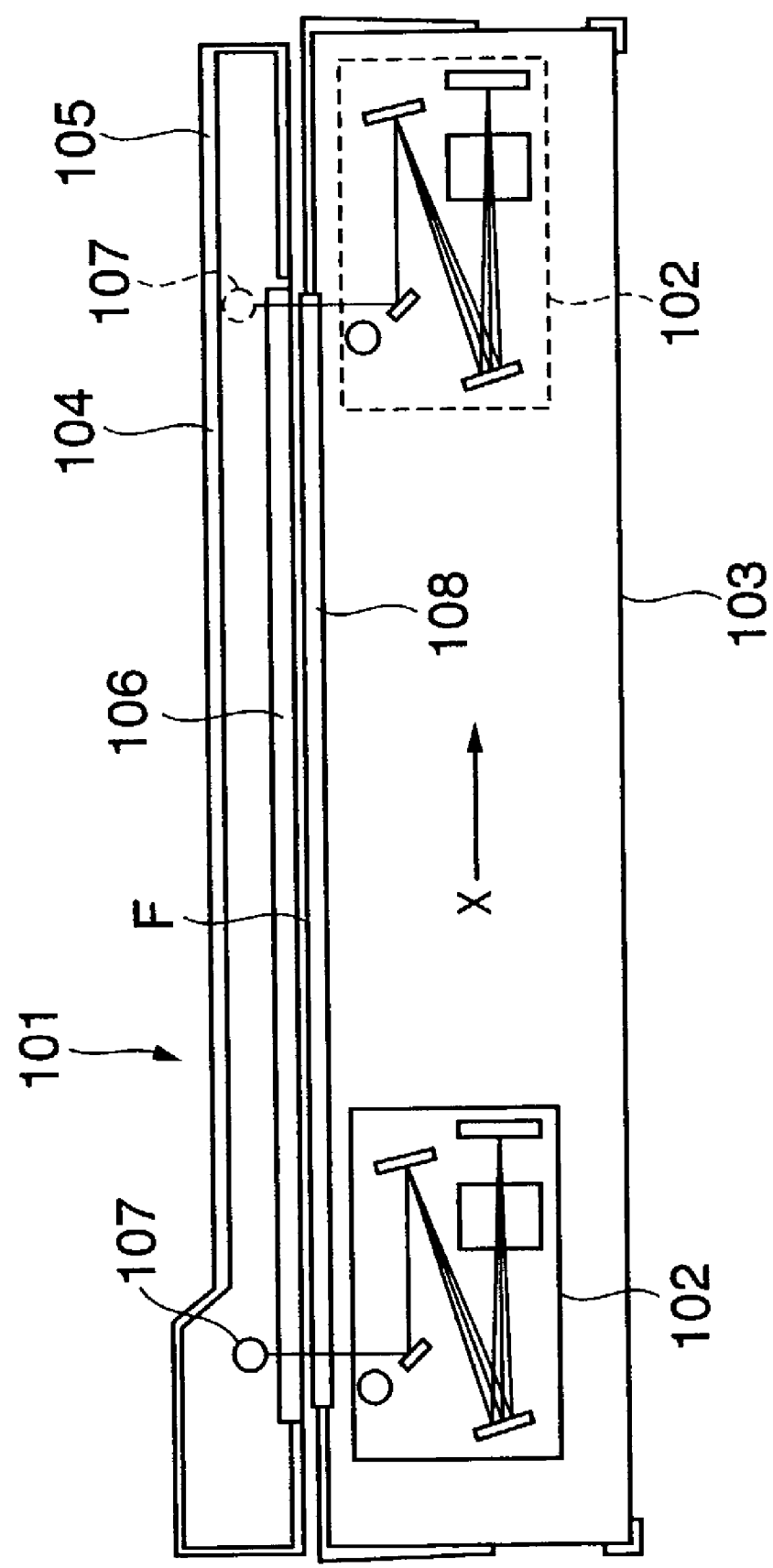
FIG. 8 is a schematic sectional view of a conventional image reading apparatus.

In the second embodiment with the above arrangement, upon reading a transparent original, the reflecting original illumination lamp 11 is turned off, and the infrared LED 16*a* on the dust/scratch detection LED substrate 16 and the transparent original illumination lamp 7 are turned on, so as to align the dust/scratch detection LED substrate 16 and image reading unit 10, as shown in FIG. 7A.

By synchronously moving the light source unit 3 and image reading unit 10 in the subscanning direction, images of dust, scratches, and the like on a transparent original are projected onto the CCD line sensor 12 via the reflecting mirror 14 and lens 13.

In this case, since light coming from the infrared LED chips 8*a* on the dust/scratch detection LED substrate 8 includes only infrared light components, a transparent original such as a negative film, positive film, or the like transmits the infrared light components independently of its image (exposed image), and images of dust, scratches, and the like that physically intercept an optical path are projected as a shade onto the CCD line sensor 12, thus satisfactory detecting dust or scratches.

In this case, the transparent original illumination lamp 7 is ON. However, since the reflection plate 9 is provided, as described above, light coming from the transparent original illumination lamp 7 can be prevented from leaking into an infrared read image.

Subsequently, as shown in FIG. 7B, the transparent original illumination lamp 7 and image reading unit 10 are aligned, and the light source unit 3 and image reading unit 10 are synchronously moved in the subscanning direction, thereby projecting an image on the transparent original onto the CCD line sensor 12 via the reflecting mirror 14 and lens 13.

At this time, since the transparent original illumination lamp 7 has warmed up well, and a warm up time of the lamp itself need not be independently assured, the reading time can be shortened, and an image can be read satisfactorily.

After that, both the dust/scratch detection image information (defect information) obtained by the above method, and the image information read from the image on the transparent original undergo an image process. With this image process, a defect region which is recognized on the dust/scratch detection image and is formed due to dust or scratches is interpolated using its surrounding transparent original read image information, thus obtaining high-quality transparent original image information from which the influences of dust or scratches have been removed.

Third Embodiment

Figure 9:
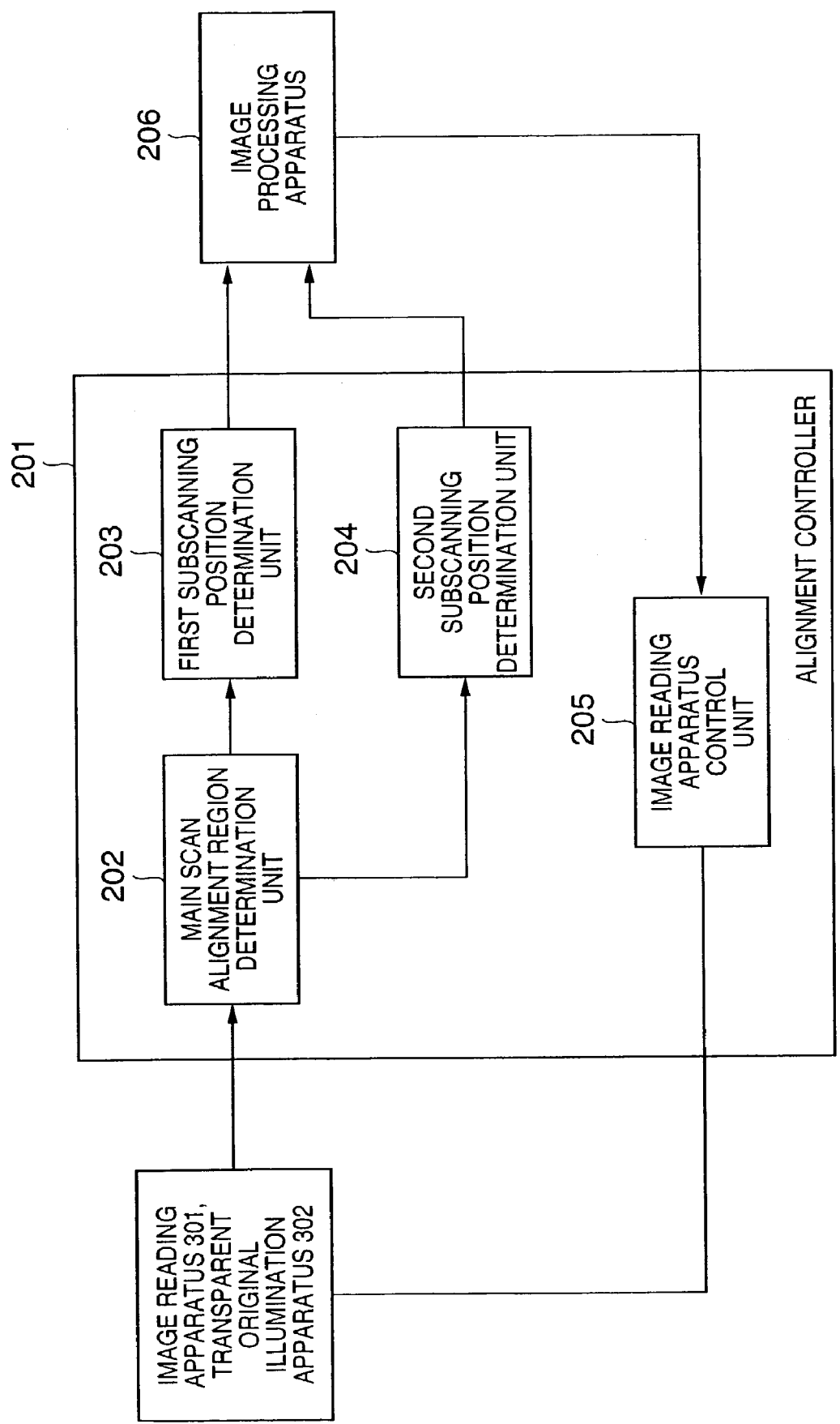
FIG. 9 is a block diagram showing the arrangement of an image reading apparatus control system according to the third to sixth embodiments of the present invention.
Figure 22:
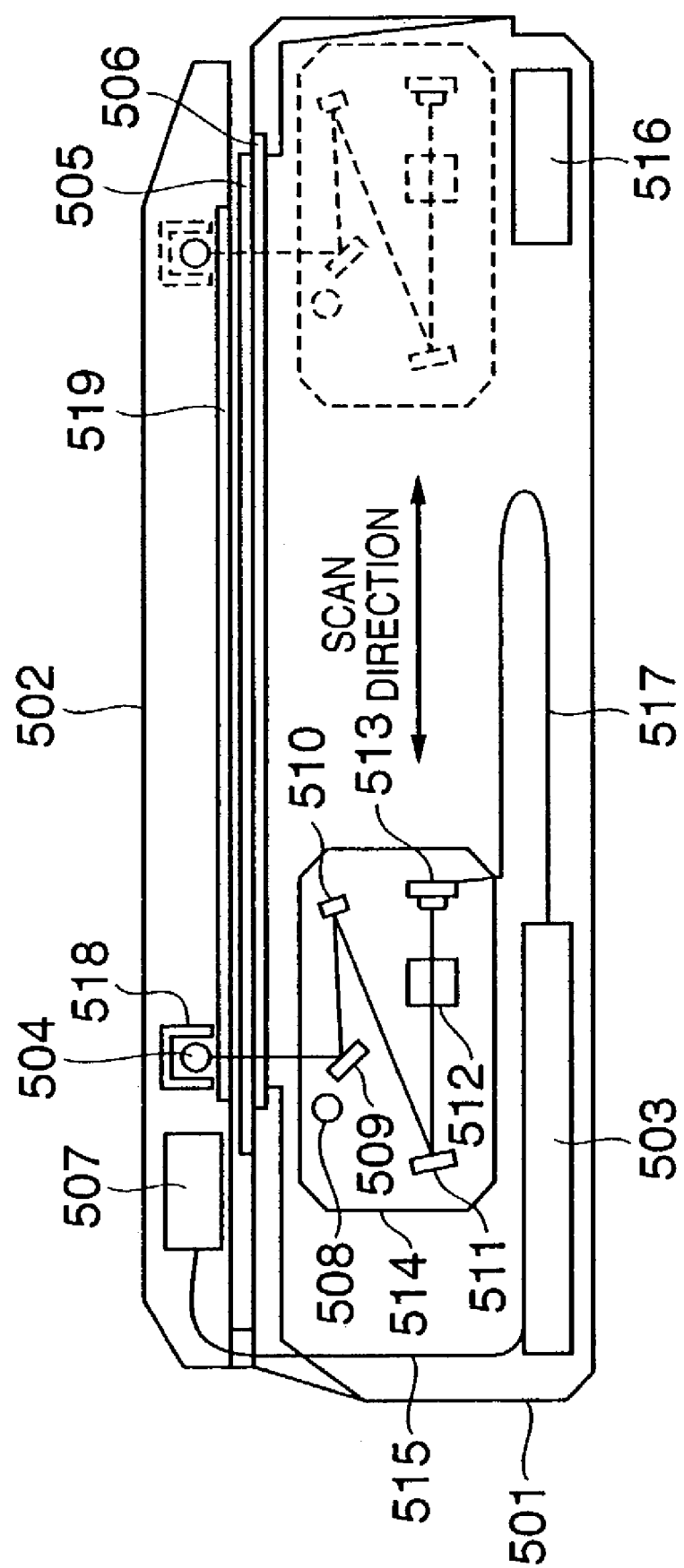
FIG. 22 is a schematic view showing the structure of an image reading apparatus to explain prior art.

FIG. 9 is a block diagram showing the arrangement of an image reading apparatus control system that uses a subscanning alignment method of a transparent original illumination unit 328 and optical unit 314 according to the third embodiment of the present invention. In this embodiment, the arrangement of an image reading apparatus is substantially the same as that of the prior art shown in FIG. 22.

Referring to FIG. 9, the image reading apparatus control system comprises an image reading apparatus 301, transparent original illumination apparatus 302, alignment controller 201, and image processing apparatus 206 as a whole. The image reading apparatus 301 and transparent original illumination apparatus 302 read a predetermined image upon reading a film original. The read image temporarily undergoes an image process in the image processing apparatus via a main scan alignment region determination unit 202 and first subscanning position determination unit 203, and the transparent original illumination apparatus 302 and an optical unit 314 are aligned on the basis of that information. Also, a second subscanning position determination unit 204 performs another alignment on the basis of the image information from the image reading apparatus 301 and transparent original illumination apparatus 302, and the system is ready to acquire final image information.

This control system is achieved by only an arbitrary one of alignment units, i.e., even when the main scan alignment region determination unit 202, first subscanning position determination unit 203, or second subscanning position determination unit 204 is omitted. Since the image reading apparatus 301 and transparent original illumination apparatus 302 are the same as those described in the prior art, a description thereof will be omitted. Since the image processing apparatus 206 is a known apparatus for processing image information, a description thereof will be omitted.

The main scan alignment region determination unit 202 clears away any alignment errors due to a tilt or the like between the optical unit 314 and transparent original illumination unit 328, which have been explained in the prior art.

Figure 10:
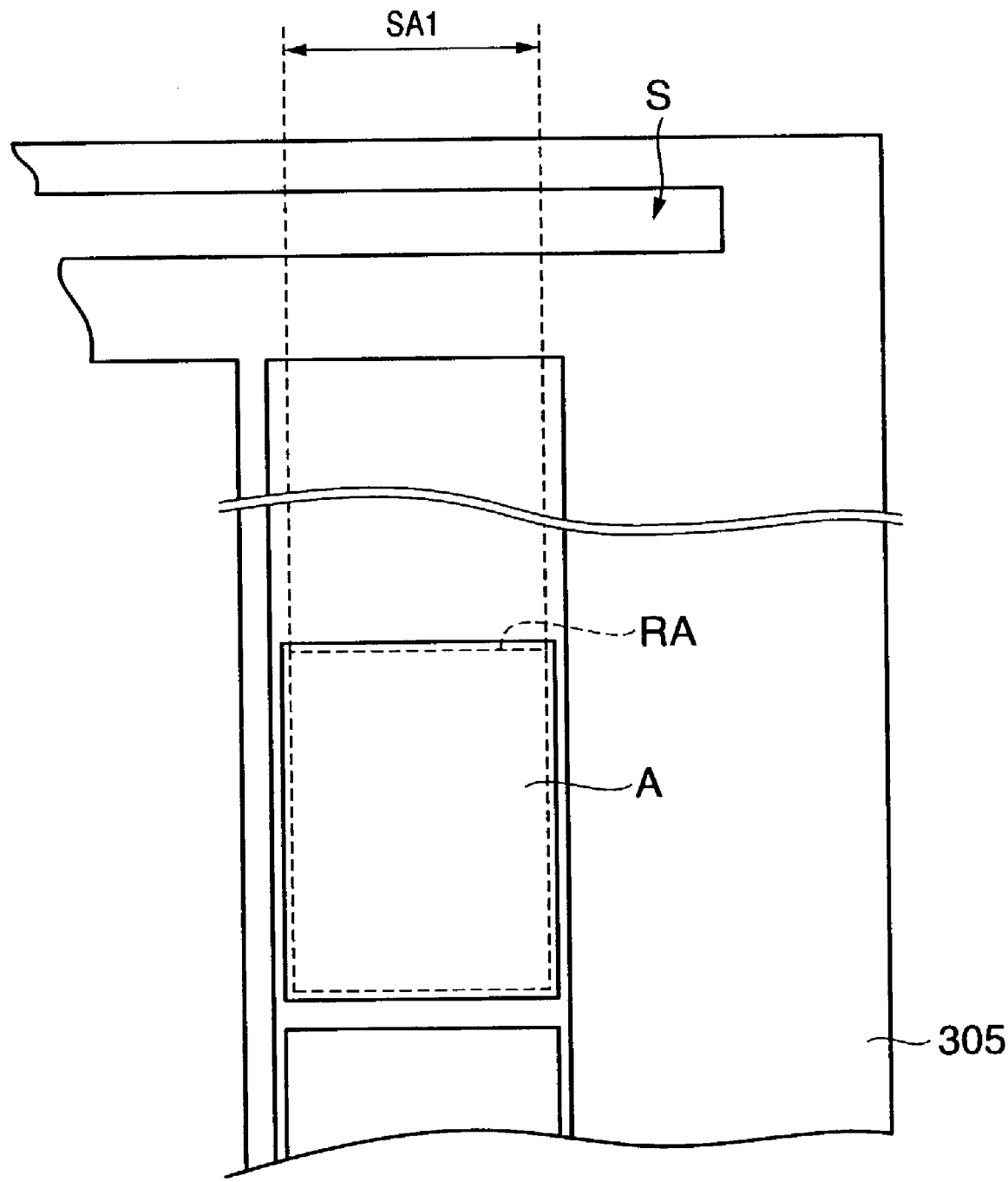
FIG. 10 is an enlarged view of a film guide to explain the third embodiment of the present invention.

The main scan alignment region determination unit 202 will be described below with reference to FIG. 10. FIG. 10 is an enlarged view of a film guide 505 (305) near film A, which has been explained using FIG. 23.

Figure 23:
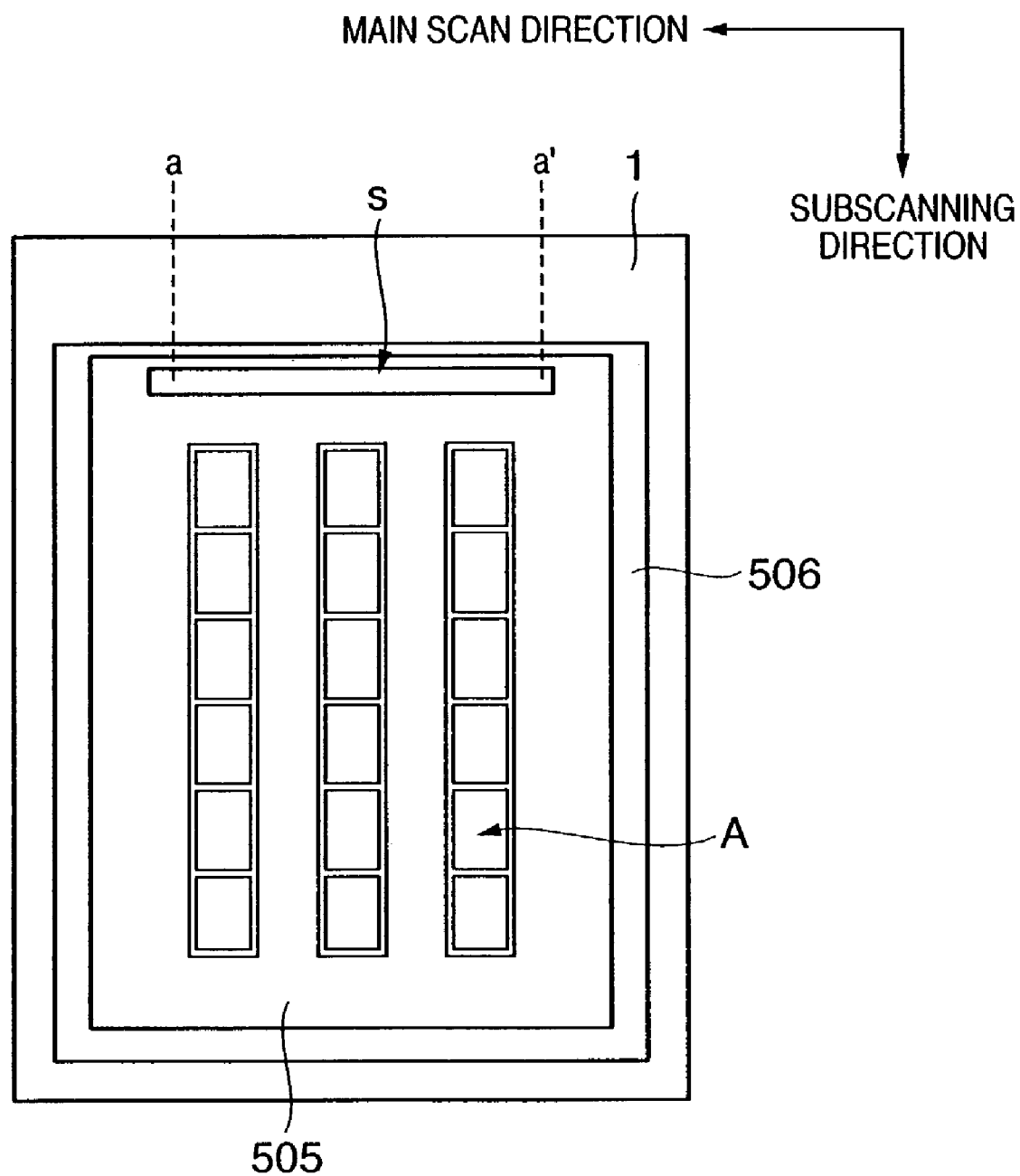
FIG. 23 is a view showing a film guide to explain prior art.
Figure 24:
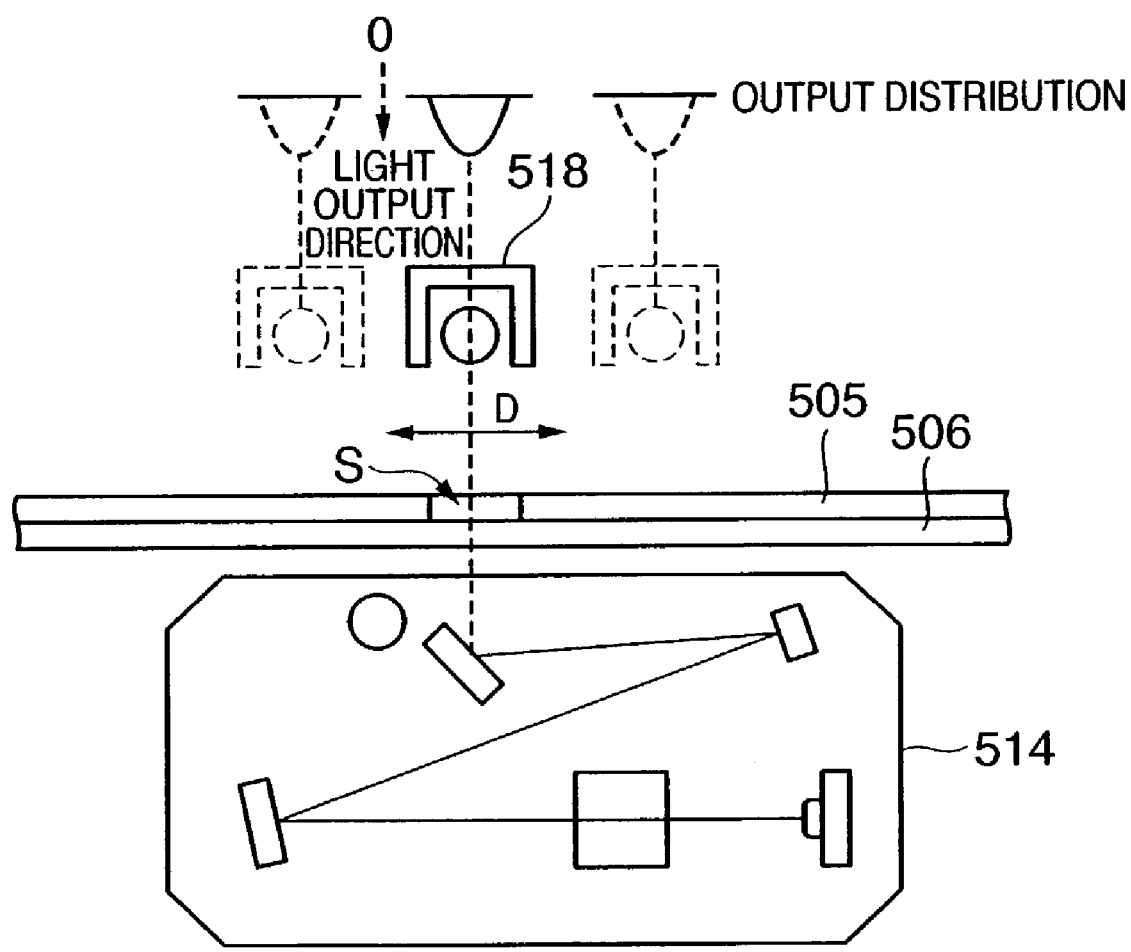
FIG. 24 is a view showing alignment between a transparent original illumination unit and optical system to explain prior art.

When alignment is made within a calibration region S with respect to a main scan width SA1 required for an image reading region RA used to read image information of film A, the main scan width can be shorter than that required for alignment at positions a and a' in FIG. 23. For this reason, the influences of a tilt between the optical unit 314 and transparent original illumination unit 328 and the light amount distributions can be eliminated, and a highly efficient illumination device can be implemented without increasing cost.

The first subscanning position determination unit 203 allows quick and accurate alignment since it makes alignment using only one light source if a plurality of light sources are used, or since it makes alignment using an LED light source if a plurality of light sources include the LED light source.

Figure 11:
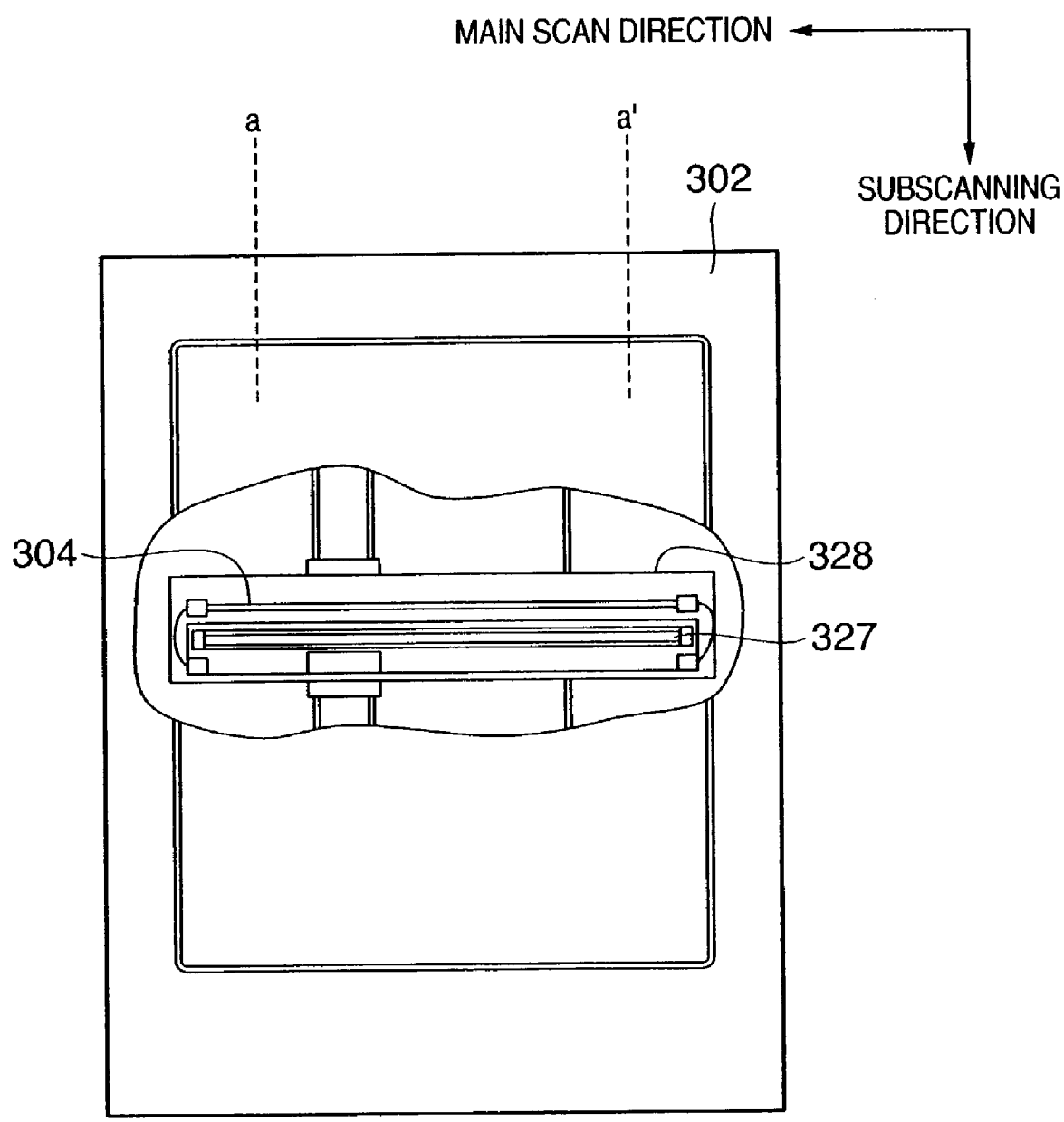
FIG. 11 is a schematic view of a transparent original illumination apparatus to explain the third embodiment of the present invention.
Figure 12A:
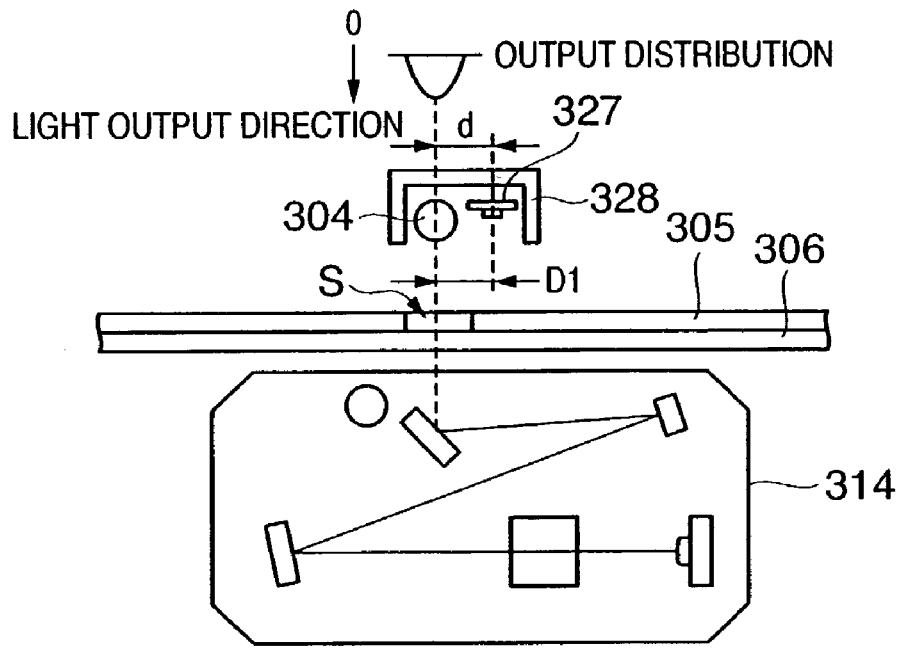
FIGS. 12A and 12B are views showing alignment between a transparent original illumination unit and optical system to explain the third embodiment of the present invention.
Figure 12B:
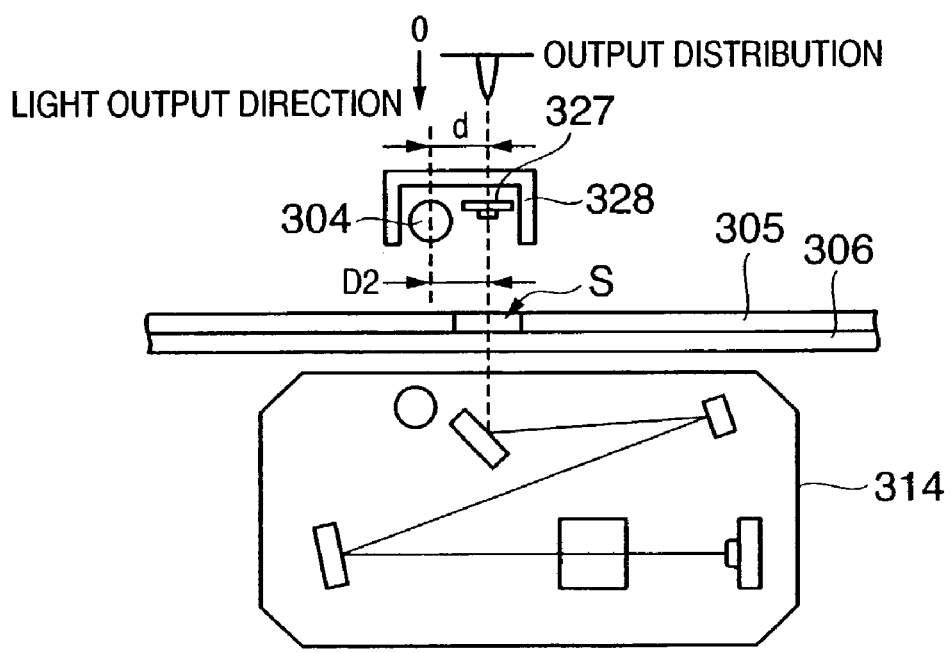
Figure 13A:
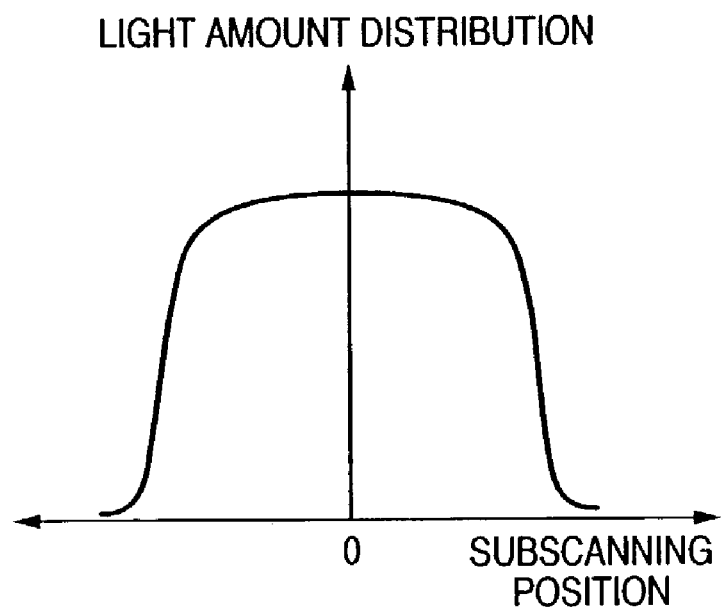
FIGS. 13A and 13B show the light amount distributions of the transparent original illumination unit to explain the third embodiment of the present invention.
Figure 13B:
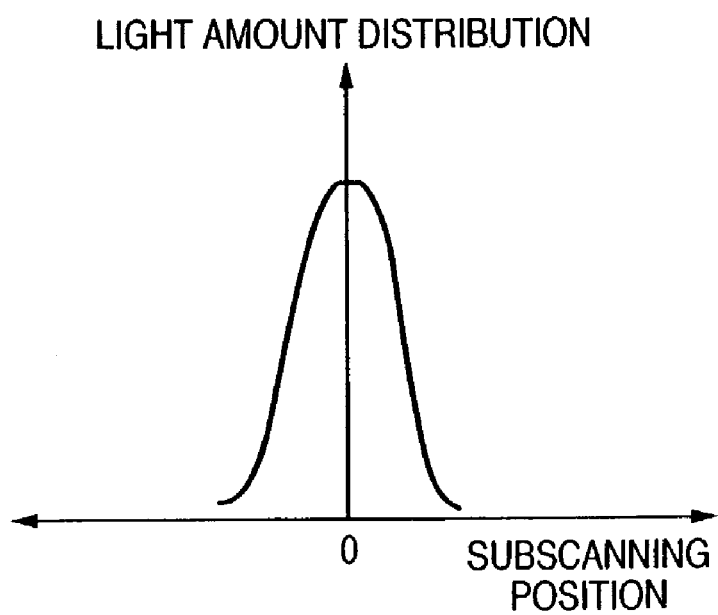

The first subscanning position determination unit 203 will be described below with reference to FIG. 11, FIGS. 12A and 12B, FIGS. 13A and 13B, and FIG. 14. FIG. 11 is a view showing the transparent original illumination apparatus 302 viewed from the film position side, and shows the transparent original illumination unit 328 which has an infrared LED 327 used to detect dust or scratches on a film, and a light source 304 used to read image information. The infrared LED 327 and light source 304 are arranged substantially parallel to each other. FIG. 12A shows a case wherein alignment is made at nearly a maximum position of the light amount distribution using the light source 304 used to read image information. FIG. 12B shows a case wherein alignment is made at nearly a maximum position of the light amount distribution using the infrared LED 327 used to detect dust or scratches. FIG. 13A shows an example of the light amount distribution of the light source 304, and FIG. 13B shows an example of the light amount distribution of the infrared LED 327.

The infrared LED 327 and light source 304 physically have nearly a distance d between them. Also, let D1 be a distance from a position aligned using the light source 304 in FIG. 12A, and D2 be a distance from a position aligned using the infrared LED 327 in FIG. 12B to the light source 304. Then, since the light amount distribution of the infrared LED 327 has a narrower uniform range than that of the light source 304, as shown in FIGS. 13A and 13B, we have:

$$|d-D1| \geq |d-D2| \qquad (1)$$

Inequality (1) means that if alignment is made using the infrared LED 327, alignment using the light source 304 can be completed by only moving a predetermined distance d without actually making alignment using the light source 304.

Figure 14:
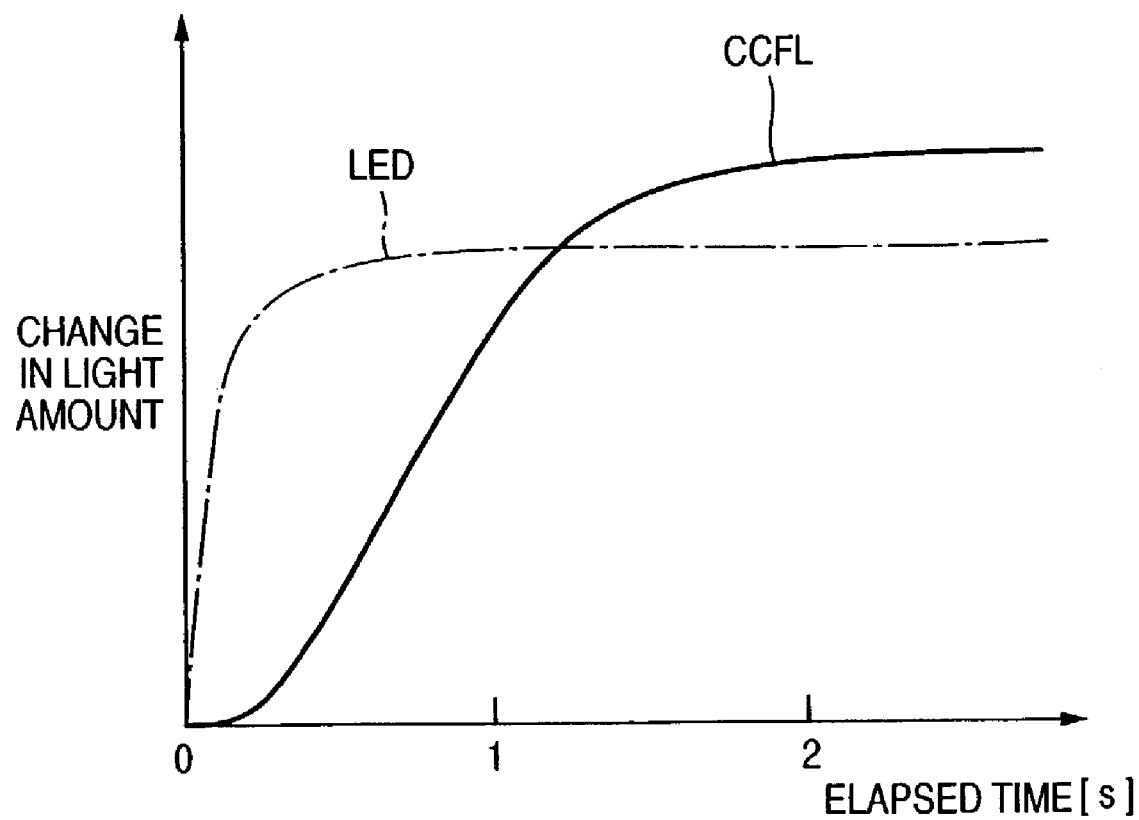
FIG. 14 shows a change in light amount of a light source to explain the third embodiment of the present invention.

FIG. 14 shows a change in light amount immediately after the LED and a CCFL are turned on. For example, if the light source 304 comprises a CCFL, the LED requires a much shorter time until the amount of light becomes stable after it is turned on than the CCFL, as shown in FIG. 14. That is, the amount of light of the LED quickly rises. Hence, when both the infrared LED 327 and light source 304 are arranged, lighting and alignment processes are executed using the infrared LED 327, thus implementing quick and optimal alignment. Therefore, it is effective to use an LED as that for alignment even when that LED is not an infrared LED used to detect dust or scratches, and it is particularly effective when the light source 304 comprises a white LED or R, G, and B LEDs.

The second subscanning position determination unit 204 prevents positional deviation as a conventional problem which readily occurs between the optical unit 304 and transparent original illumination unit 328 upon reading a plurality of film frames or in intermittent reading.

Figure 15:
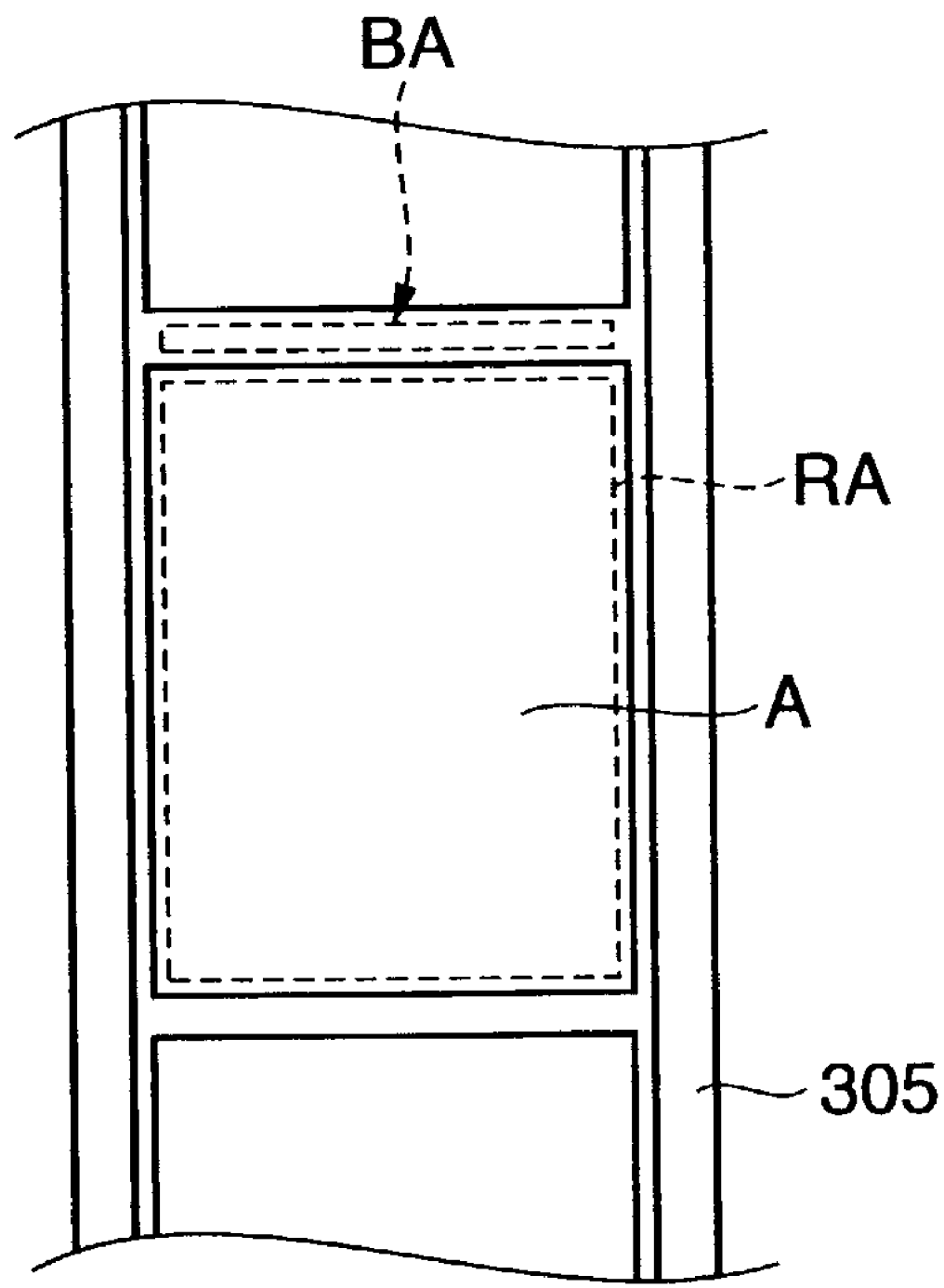
FIG. 15 is an enlarged view of a film guide to explain the third embodiment of the present invention.
Figure 16A:
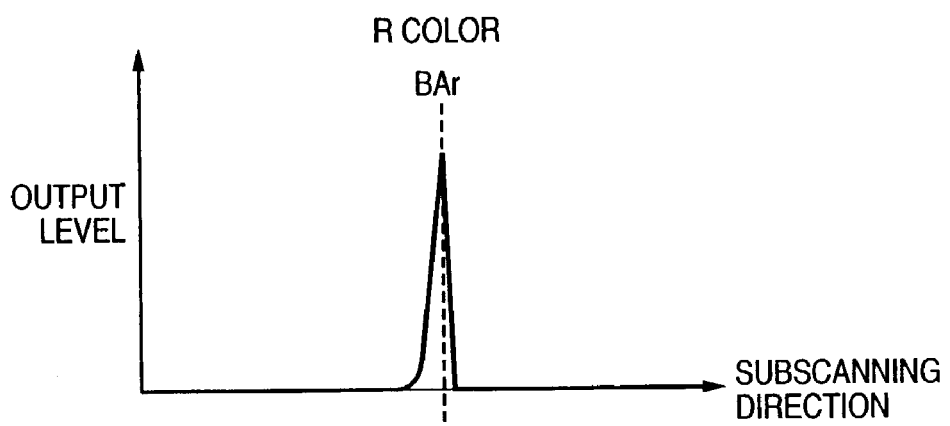
FIGS. 16A, 16B, and 16C show histograms of a film base to explain the third embodiment of the present invention.
Figure 16B:
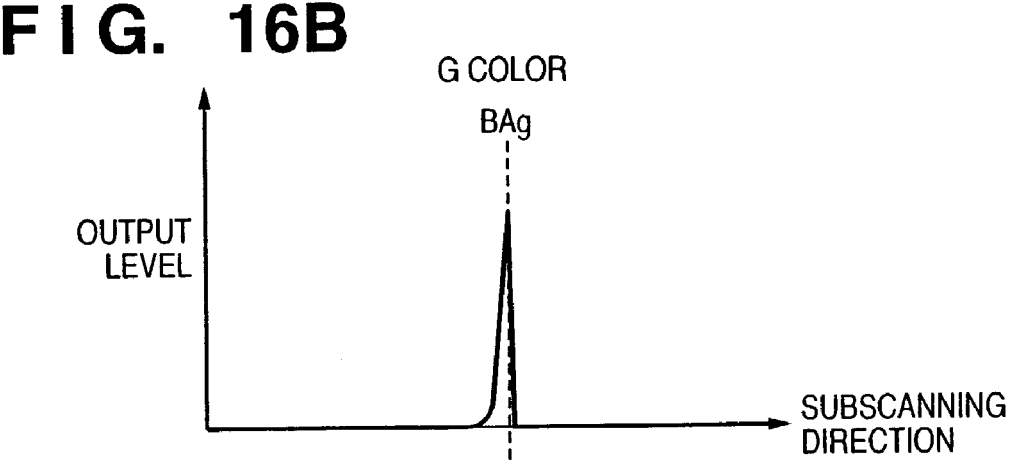
Figure 16C:
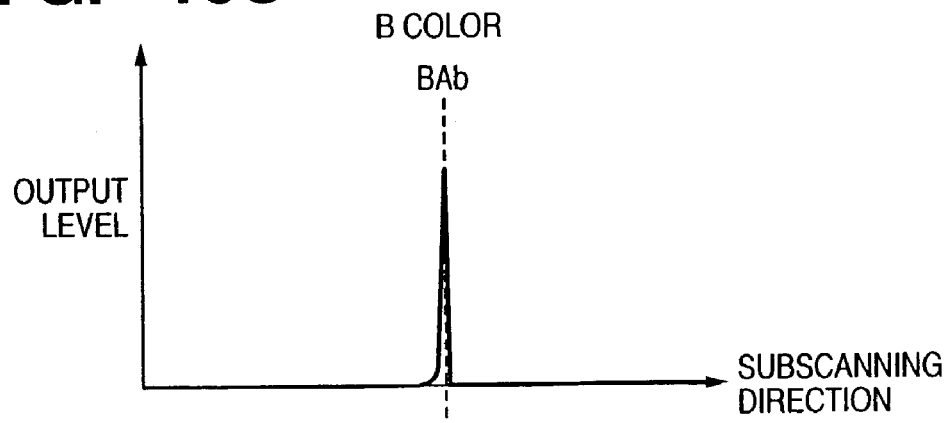
Figure 17:
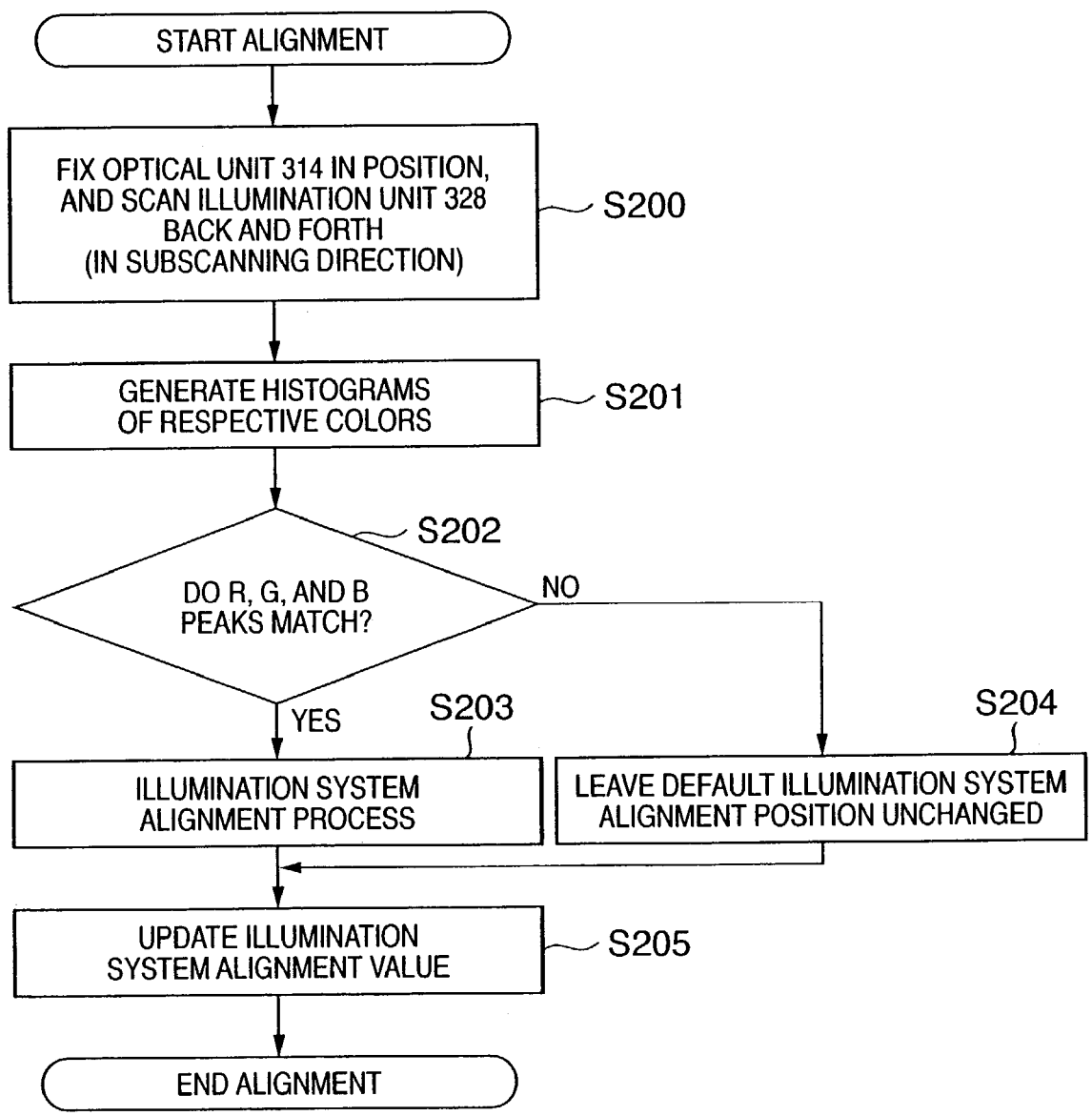
FIG. 17 is a control flow chart for explaining the third embodiment of the present invention.

The second subscanning position determination unit 204 will be described below using FIG. 15, FIGS. 16A, 16B, and 16C, and FIG. 17. FIG. 15 is an enlarged view of the film guide 505 (305) near film A, which has been explained using FIG. 23. Before reading an image reading region RA used to read image information of film A, the aforementioned alignment is made in an inter-film frame region BA. FIGS. 16A, 16B, and 16C show examples of the output distributions in the subscanning directions of R, G, and B colors in the region BA. Peak outputs BAr, BAg, and BAb of respective colors can be easily detected by an averaging process, and the alignment is made in the inter-film frame region BA with reference to these values. FIG. 17 is a flow chart of a second subscanning position determination process.

Referring to FIG. 17, the optical unit 314 is fixed in position, and the illumination unit 328 is scanned back and forth (subscanning direction) in step S200. In step S201, histograms shown in FIGS. 16A, 16B, and 16C are generated. It is checked in step S202 if the peak values BAr, BAg, and BAb respectively match at a given position in the subscanning direction. If BAr, BAg, and BAb are detected in step S202, the flow advances to step S203. In step S203, alignment is made to make the peak values match at a given position in the subscanning direction. If the peak values match, they are considered as those of a base density region of the film, and the alignment control is made using BAr, BAg, and BAb as base information. However, if peak values match even when they are not those of the base density region, these values may not be influenced by image information on the film and, hence, the alignment control can be made. If BAr, BAg, and BAb are not detected in step S202, a default alignment position is left unchanged in step S204. In this case, it is difficult to select one of mismatching peak values to which the remaining values are to be adjusted. In step S205, the positions of the optical unit 304 and transparent original illumination unit 328 used to read the film reading region RA are updated.

Note that the alignment result using the base information may be compared with the default position to update a final position. Also, the above process can be made in the transparent original illumination unit 328 having a plurality of light sources. Furthermore, in place of BAr, BAg, and BAb for three colors explained using FIGS. 16A, 16B, and 16C, control can be made using one of these signals or a signal corresponding to light emitted by the infrared LED 327. Moreover, in addition to a method of making alignment before a film image is read, it is effective to make alignment after image information for each frame is read upon reading a plurality of frames. In addition, alignment can be made with reference to base information of a film edge portion while reading a film image.

In this embodiment, judgement is made to see if peak values of waveforms match (see step S202). However, the peak values need not perfectly match. That is, the peak values need only roughly match within a predetermined range. Also, whether or not the waveforms of histogram match may be used as information for making a judgement.

As described above, according to this embodiment, a highly efficient illumination device can be implemented without increasing cost.

Fourth Embodiment

Figure 18:
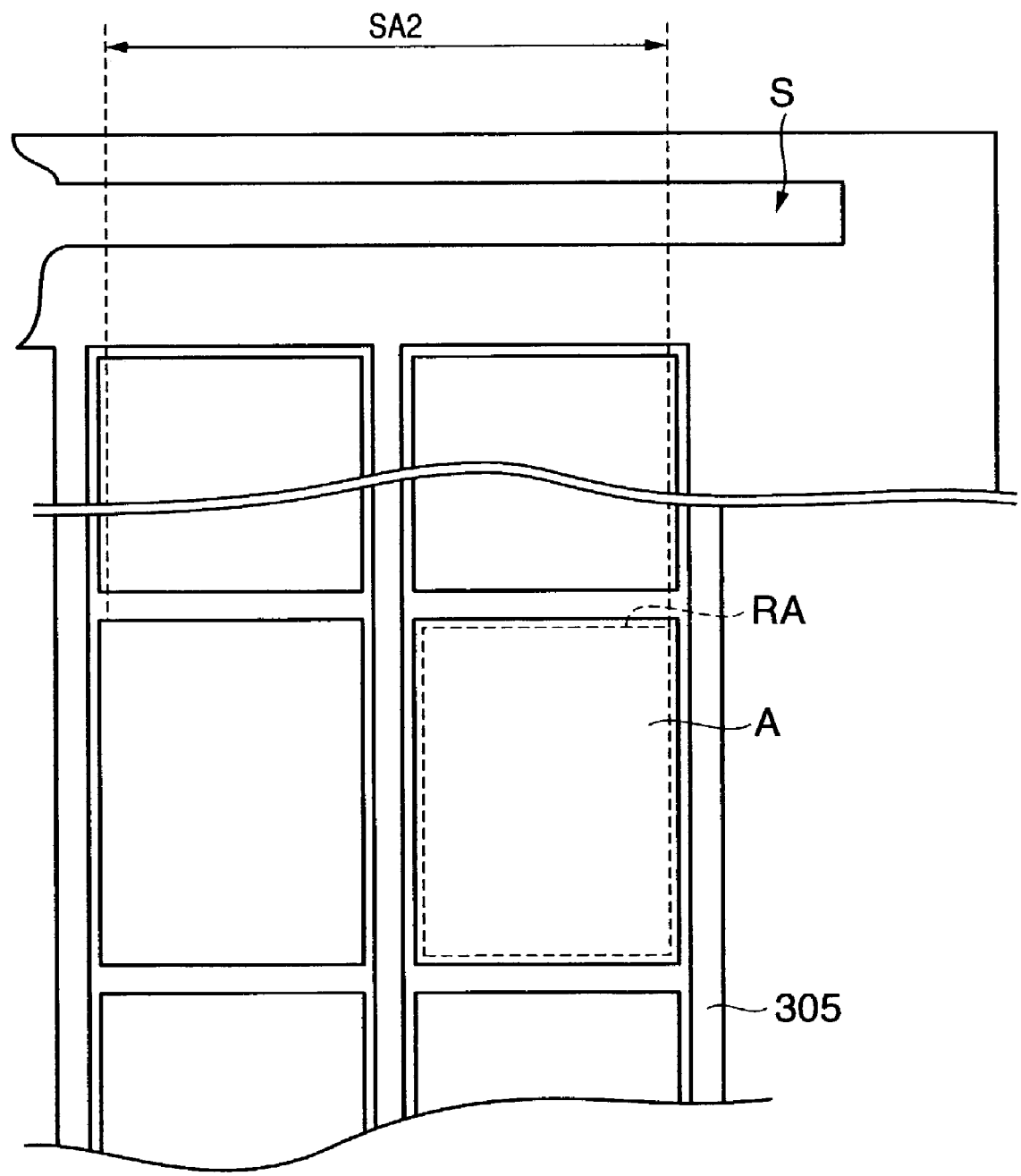
FIG. 18 is an enlarged view of a film guide to explain the fourth embodiment of the present invention.

The main scan alignment region determination unit 202 according to the fourth embodiment will be described below with reference to FIG. 18. FIG. 18 is an enlarged view of the film guide 505 (305) near film A, which has been explained using FIG. 23. Alignment is made within a calibration region S with respect to a main scan width SA2 which is required for an image reading region RA used to read image information of film A, and nearly covers two columns of film frame positions. Even in this case, the main scan width can be shorter than that required for alignment at positions a and a' in FIG. 23, as in the first embodiment. For this reason, the influences of a tilt between the optical unit 314 and transparent original illumination unit 328 and the light amount distributions can be eliminated, and a highly efficient illumination device can be implemented without increasing cost. Also, in this embodiment, the alignment process may be omitted upon reading images of two columns of film frames corresponding to the region SA2.

Fifth Embodiment

Figure 19:
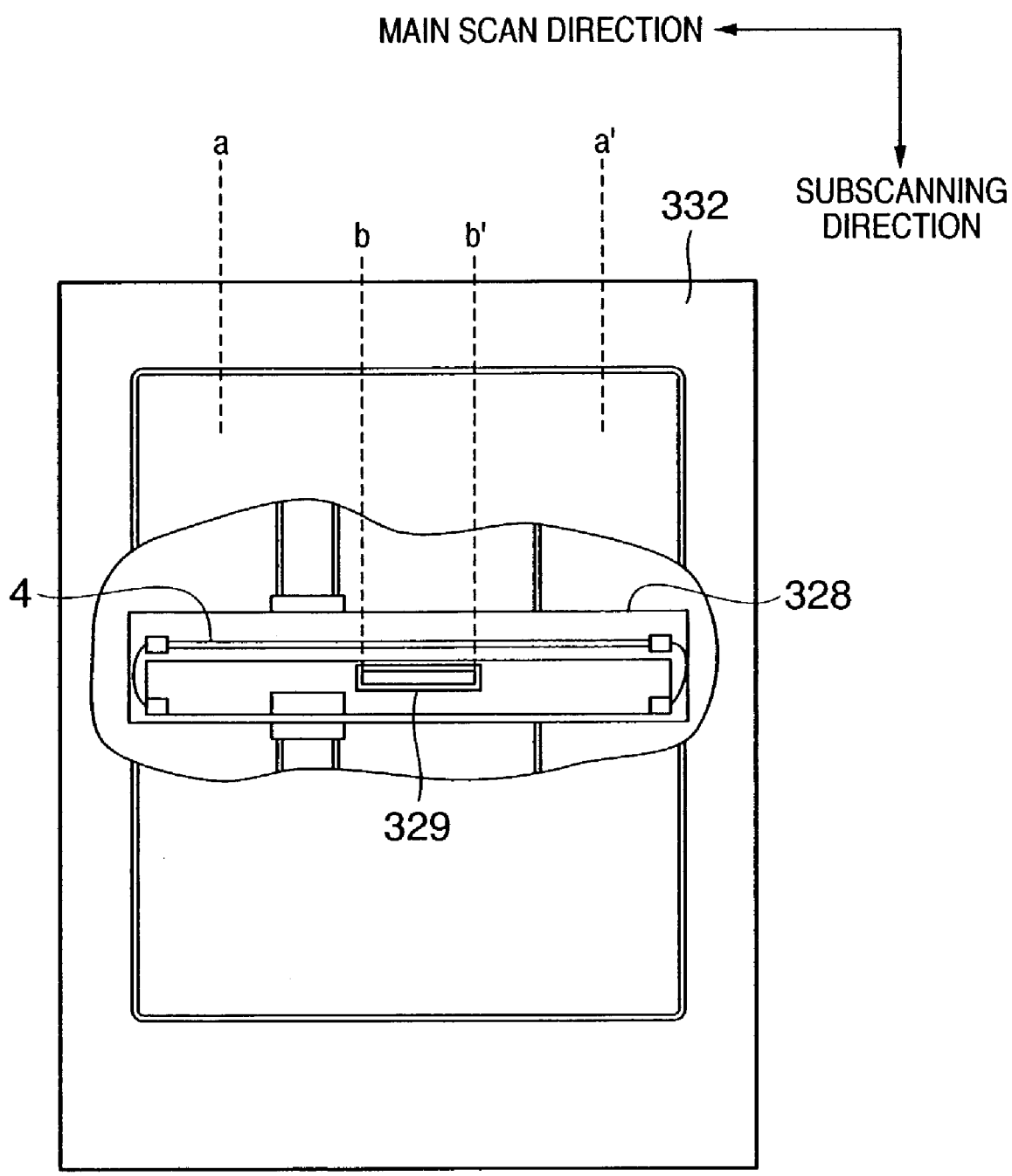
FIG. 19 is a schematic view of a transparent original illumination apparatus to explain the fifth embodiment of the present invention.

Another embodiment of the first subscanning position determination unit 203 will be described below with reference to FIG. 19. FIG. 19 is a view showing a transparent original illumination apparatus 332 viewed from the film position side, and shows a transparent original illumination unit 328 which has an infrared LED 329 used to detect dust or scratches on a film, and a light source 304 used to read image information. The infrared LED 329 and light source 304 are arranged substantially parallel to each other.

This embodiment uses the transparent original illumination apparatus 332 in which the infrared LED 329 for dust/scratch removal is arranged at only a specific main scan position range b-b'. When both the infrared LED 329 and light source 304 are arranged, even the infrared LED 329 nearly corresponding to only the main scan width b-b' as in this embodiment can attain quick and optimal alignment although it requires precision which is high enough to maintain sufficient stability of the light amount distribution upon reading an image falling outside the range b-b'. Therefore, it is effective to use an LED as that for alignment even when that LED is not an infrared LED used to detect dust or scratches, and it is particularly effective when the light source 304 comprises a white LED or R, G, and B LEDs.

Sixth Embodiment

Figure 20:
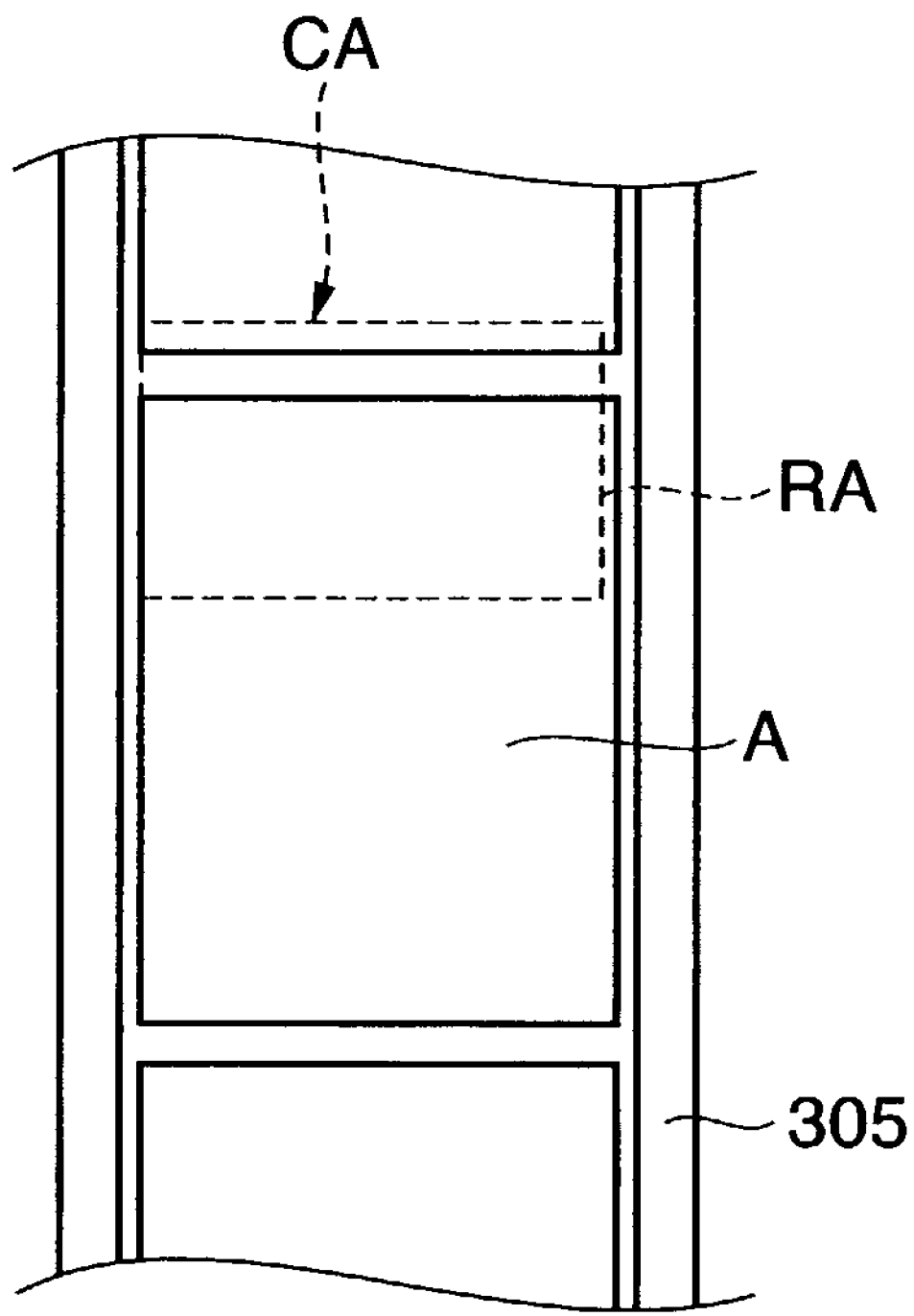
FIG. 20 is an enlarged view of a film guide to explain the sixth embodiment of the present invention.
Figure 21A:
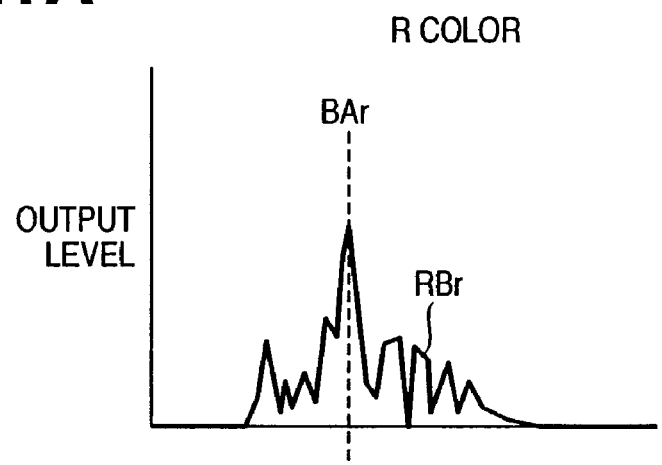
FIGS. 21A, 21B, and 21C show the histograms of a film base to explain the sixth embodiment of the present invention.
Figure 21B:
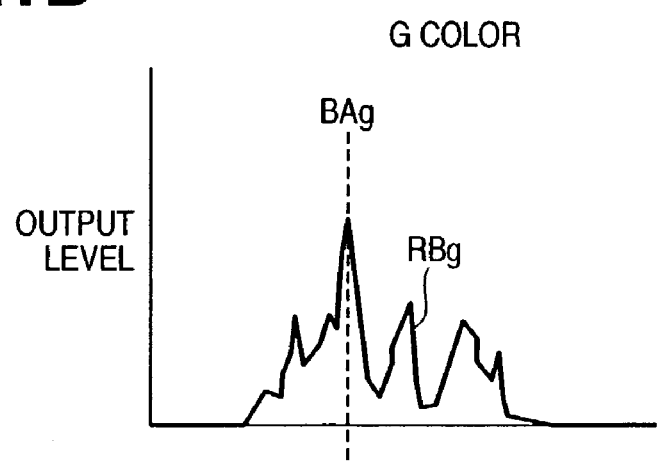
Figure 21C:
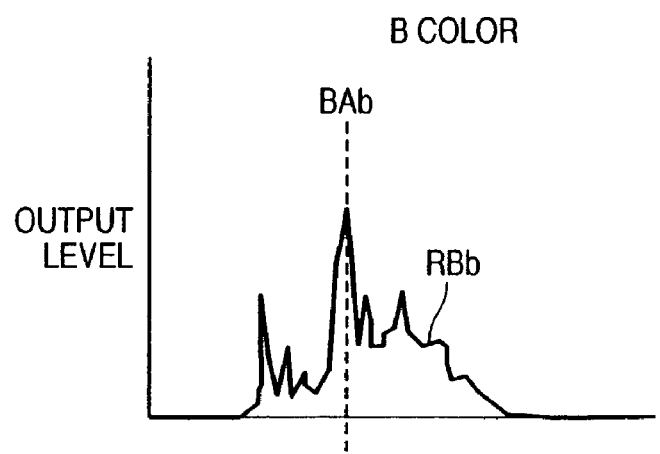

Another embodiment of the second subscanning position determination unit 204 will be described below with reference to FIG. 20 and FIGS. 21A, 21B, and 21C. FIG. 20 is an enlarged view of the film guide 505 (305) near film A, which has been explained using FIG. 23. Before reading an image reading region RA used to read image information of film A, the aforementioned alignment is made in an inter-film frame region CA. FIGS. 21A, 21B, and 21C show examples of the output distributions in the subscanning directions of R, G, and B colors in the region CA. In FIGS. 21A, 21B, and 21C, RBr, RBg, and RBb of respective colors as image data that include the image region in FIG. 20, and peak outputs BAr, BAg, and BAb as base information can be easily detected by histogram analysis and an averaging process, and the alignment is made in the inter-film frame region CA with reference to BAr, BAg, and BAb.

In place of BAr, BAg, and BAb for three colors explained using FIGS. 21A, 21B, and 21C, control can be made using one of these signals or a signal corresponding to light emitted by the infrared LED 327.

Furthermore, in addition to a method of making alignment before a film image is read, alignment may be made after image information for each frame is read upon reading a plurality of frames. In addition, alignment can be made with reference to base information of a film edge portion while reading a film image.

As described above, according to this embodiment, a highly efficient illumination device can be implemented without increasing cost.

As described above, according to the third to sixth embodiments, since the transparent original illumination unit and optical unit can be aligned within a minimum main scan width required for reading, the precision required for the arrangement can be reduced, and a transparent original illumination unit with illumination efficiency of a high optical output can be realized.

Since the alignment process is done using the LED light source that basically requires no warm up time, and that position is moved to the physically determined position of the image reading light source by a predetermined amount, the pre-processing time in an image reading process can be shortened.

Furthermore, since the alignment process is corrected again using an inter-frame region of one or a plurality of film frames, optimal alignment can be done without requiring any increase in cost and return movement to a shading region.

Another Embodiment

The scope of the present invention includes an embodiment which is implemented by supplying a program code of software that implements the functions of the embodiments to a computer (or a CPU or MPU) in a system or apparatus connected to various devices, and making the computer in the system or apparatus operate the various devices in accordance with the stored program, so as to operate the various devices for the purpose of implementing the functions of the embodiments.

In this case, the program code itself implements the functions of the embodiments, and the program code itself constitutes the present invention. As a transmission medium of that program code, a communication medium (a wired line such as an optical fiber or the like, a wireless line, or the like) in a computer network (a LAN, WAN such as the Internet, wireless communication network, or the like) system used to transmit and supply program information as a carrier wave can be used.

Furthermore, a device for supplying the program code to the computer, e.g., a recording medium that stores the program code constitutes the present invention. As the recording medium for storing such program code, for example, a flexible disk, hard disk, optical disk, magneto-optical disk, CD-ROM, magnetic tape, nonvolatile memory card, ROM, and the like may be used.

The program code is also included in the embodiment of the present invention not only when the functions of the embodiments are implemented by executing the supplied program code by the computer but also when the functions of the embodiments are implemented by collaboration of the program code and an OS (operating system) or another application software running on the computer.

Moreover, the program code is included in the present invention when the functions of the embodiments are implemented by executing some or all of actual processes by a CPU or the like arranged in a function extension board or a function extension unit, which is inserted in or connected to the computer, after the supplied program code is stored in a memory of the extension board or unit.

Note that the shapes and structures of respective portions described in the above embodiments are merely examples of embodiments upon practicing the present invention, and the technical scope of the present invention must not be construed to be strictly limited to them. That is, various modifications of the present invention may be made without departing from its spirit or principal features.

As described above, according to the first and second embodiments, the image reading apparatus which reads image information of a transparent original by scanning a light source unit in synchronism with an image reading unit can obtain a high-quality read image from which dust or scratches have been removed.

According to the third to sixth embodiments, since alignment between a transparent original illumination unit and optical unit required to read an image can be precisely done within a shorter period of time, the precision required for the arrangement can be reduced, and a transparent original illumination unit with high illumination efficiency can be formed, thus allowing high-speed reading of a high-quality image without increasing cost.

As many apparently widely different embodiments of the present invention can be made without departing from the spirit and scope thereof, it is to be understood that the invention is not limited to the specific embodiments thereof except as defined in the appended claims.

What is claimed is:

1. An image reading apparatus comprising:
a light source unit containing a first light source that emits light having a wavelength in a visible range and a second light source that emits light having a wavelength in an invisible range;

an image reading unit that forms an image of a transparent object illuminated by the light source unit on an image pickup element via an optical system; and image scanning means for selectively obtaining image information of the object illuminated by the first light source or the second light source by moving the light source unit, the image reading unit, and the object relatively in a sub scanning direction such that an image of the object, which is illuminated by the first light source or the second light source, is selectively formed on the image pickup element, wherein the first light source emits light even in obtaining operation of an image of the object illuminated by the second light source, and wherein the first light source and the second light source of the light source unit are positioned at the same side of the object and opposing to said image reading unit and adjacent to each other in the sub scanning direction, and are separated by a light-shielding member so as to prevent the light from the first light source from leaking into the image information of the object illuminated by the second light source.

2. An image reading apparatus according to claim 1, wherein the light source unit and the image reading unit face the object.

3. An image reading apparatus according to claim 1, wherein the light source unit and the image reading unit move synchronously relatively to the object.

4. An image reading apparatus according to claim 1, further comprising correction means for removing defective information from the image information of the object.

5. An image reading apparatus according to claim 1, wherein the second light source comprises a plurality of infrared LEDs arranged in an array on a substrate in a main scanning direction.

6. An image reading apparatus according to claim 1, wherein the second light source comprises an infrared LED and a light guide member disposed on a substrate, the light guide member guiding light emitted from the infrared LED.

7. An image reading apparatus according to claim 1, wherein the light-shielding member is projected more towards the object than the first light source and the second light source are.

8. An image reading apparatus according to claim 1, wherein the first light source and the second light source are arranged in an array in a first direction, and wherein the light-shielding member is longer than the first and second light sources in the first direction.

9. An image reading apparatus according to claim 1, wherein the first light source is turned on upon turning on the second light source.

10. An image reading apparatus according to claim 1, wherein the light-shielding member comprises a reflecting member.

11. A method of controlling an image reading apparatus including a light source unit containing a first light source that emits light having a wavelength in a visible range and a second light source that emits light having a wavelength in an invisible range; and an image reading unit that forms an image of a transparent object illuminated by the light source unit on an image pickup element via an optical system, the first light source and the second light source of the light source unit being positioned at the same side of the object and opposing to said image reading unit and adjacent to each other in the sub scanning direction and separated by a light-shielding member so as to prevent the light from the first light source from leaking into the image information of the object illuminated by the second light source, the method comprising:

an image scanning step for selectively obtaining image information of the object sequentially illuminated by the first light source or the second light source by moving the light source unit, the image reading unit, and the object relatively in the sub scanning direction such that an image of the object, which is illuminated by the first light source or the second light source, is selectively formed on the image pickup element, wherein the first light source is turned on upon turning on the second light source and the first light source emits light even in obtaining operation of an image of the object illuminated by the second light source.

12. A computer executable program stored in a computer readable media for controlling an image reading apparatus including a light source unit containing a first light source that emits light having a wavelength in a visible range and a second light source that emits light having a wavelength in an invisible range; and an image reading unit that forms an image of a transparent object illuminated by the light source unit on an image pickup element via an optical system, the first light source and the second light source of the light source unit being positioned at the same side of the object and opposing to said image reading unit and adjacent to each other in the sub scanning direction and separated by a light-shielding member so as to prevent the light from the first light source from leaking into the image information of the object illuminated by the second light source, the program allowing a computer to execute:

an image scanning control process which includes selectively obtaining image information of the object sequentially illuminated by the first light source or the second light source by moving the light source unit, the image reading unit, and the object relatively in the sub scanning direction such that an image of the object, which is illuminated by the first light source or the second light source, is selectively formed on the image pickup element, turning on the first light source upon turning on the second light source, and controlling the first light source to emit light even in obtaining operation of an image of the object illuminated by the second light source.

* * * * *